(12) United States Patent
Dowling et al.

(10) Patent No.: US 7,228,190 B2
(45) Date of Patent: Jun. 5, 2007

(54) METHOD AND APPARATUS FOR CONTROLLING A LIGHTING SYSTEM IN RESPONSE TO AN AUDIO INPUT

(75) Inventors: Kevin J. Dowling, Westford, MA (US); Scott Johnston, Cambridge, MA (US)

(73) Assignee: Color Kinetics Incorporated, Boston, MA (US)

( * ) Notice: Subject to any disclaimer, the term of this patent is extended or adjusted under 35 U.S.C. 154(b) by 870 days.

(21) Appl. No.: 09/886,958

(22) Filed: Jun. 21, 2001

(65) Prior Publication Data

US 2002/0038157 A1 Mar. 28, 2002

Related U.S. Application Data

(60) Provisional application No. 60/213,042, filed on Jun. 21, 2000.

(51) Int. Cl.

| | |
|---|---|
| *G06F 17/00* | (2006.01) |
| *G08B 5/00* | (2006.01) |
| *G08B 5/22* | (2006.01) |
| *A63J 5/10* | (2006.01) |
| *G10H 1/00* | (2006.01) |

(52) U.S. Cl. .................. 700/94; 340/815.46; 84/464 R
(58) Field of Classification Search .................. 343/73; 340/815.46; 84/464 R; 700/94

See application file for complete search history.

(56) References Cited

U.S. PATENT DOCUMENTS

| 3,111,057 A | 11/1963 | Cramer |
|---|---|---|
| 3,163,077 A | 12/1964 | Shank |
| 3,205,755 A | 9/1965 | Sklar |

(Continued)

FOREIGN PATENT DOCUMENTS

EP 0029474 B1 6/1981

(Continued)

OTHER PUBLICATIONS

Principles of Digital Audio, Third Edition; Ken C. Pohlmann; 1995.*

(Continued)

*Primary Examiner*—Sinh Tran
*Assistant Examiner*—Andrew C Flanders
(74) *Attorney, Agent, or Firm*—Wolf, Greenfield & Sacks, P.C.

(57) ABSTRACT

Methods and apparatus for executing a lighting program to control a plurality of light emitting diodes (LEDs) in response to at least one characteristic of an audio input. In one embodiment, the audio input is digitally processed to determine the at least one characteristic. In other embodiments, control signals for the LEDs are generated in response to a timer and/or input from a user interface, as well as in response to the at least one characteristic of the audio input. In another embodiment, the control signals for the LEDs are generated by a same computer that processes the audio input to transmit signals to speakers to audibly play the audio input. In a further embodiment, a GUI is provided to assist in authoring the lighting program. In another embodiment, the audio signal is processed before being played back. In a further embodiment, the lighting program anticipates changes in the audio input.

94 Claims, 9 Drawing Sheets

U.S. PATENT DOCUMENTS

| | | | |
|---|---|---|---|
| 3,215,022 A | 11/1965 | Orgo | |
| 3,240,099 A | 3/1966 | Irons | |
| 3,241,419 A | 3/1966 | Gracey | |
| 3,307,443 A | 3/1967 | Shallenberger | |
| 3,540,343 A | 11/1970 | Rifkin | |
| 3,550,497 A | 12/1970 | Marsh | |
| 3,845,468 A | 10/1974 | Smith | |
| 4,176,581 A | 12/1979 | Stuyvenberg | |
| 4,376,404 A * | 3/1983 | Haddad | 84/464 R |
| 4,753,148 A | 6/1988 | Johnson | |
| 4,768,086 A | 8/1988 | Paist | |
| 4,843,627 A | 6/1989 | Stebbins | |
| 4,962,687 A | 10/1990 | Belliveau et al. | |
| 5,010,459 A | 4/1991 | Taylor et al. | |
| 5,078,039 A | 1/1992 | Tulk et al. | |
| 5,191,319 A * | 3/1993 | Kiltz | 345/73 |
| 5,209,560 A | 5/1993 | Taylor et al. | |
| 5,307,295 A | 4/1994 | Taylor et al. | |
| 5,329,431 A | 7/1994 | Taylor et al. | |
| 5,402,702 A | 4/1995 | Hata | |
| 5,461,188 A * | 10/1995 | Drago et al. | 84/600 |
| 5,642,129 A | 6/1997 | Zavracky et al. | |
| 5,673,059 A | 9/1997 | Zavracky et al. | |
| 5,734,590 A | 3/1998 | Tebbe | |
| 5,737,254 A | 4/1998 | Lane et al. | |
| 5,752,225 A | 5/1998 | Fielder | |
| 5,769,527 A | 6/1998 | Taylor et al. | |
| 5,892,833 A | 4/1999 | Maag et al. | |
| 6,008,783 A | 12/1999 | Kitagawa et al. | |
| 6,016,038 A | 1/2000 | Mueller et al. | |
| 6,021,204 A * | 2/2000 | Eastty | 381/12 |
| 6,025,550 A | 2/2000 | Kato | |
| 6,031,343 A | 2/2000 | Recknagel et al. | |
| 6,037,534 A * | 3/2000 | Yasutoshi et al. | 84/477 R |
| 6,046,724 A * | 4/2000 | Hvass | 345/600 |
| 6,097,352 A | 8/2000 | Zavracky et al. | |
| 6,150,774 A | 11/2000 | Mueller et al. | |
| 6,166,496 A | 12/2000 | Lys et al. | |
| 6,211,626 B1 | 4/2001 | Lys et al. | |
| 6,225,546 B1 * | 5/2001 | Kraft et al. | 84/609 |
| 6,270,229 B1 | 8/2001 | Chien | |
| 6,292,901 B1 | 9/2001 | Lys et al. | |
| 6,362,411 B1 * | 3/2002 | Suzuki et al. | 84/626 |
| 6,618,031 B1 * | 9/2003 | Bohn et al. | 345/83 |

FOREIGN PATENT DOCUMENTS

| | | |
|---|---|---|
| EP | 495305 A2 | 7/1992 |
| EP | 823813 A2 | 2/1998 |
| EP | 935234 A1 | 8/1999 |
| EP | 942631 A2 | 9/1999 |
| GB | 2045098 A | 10/1980 |
| GB | 2135536 A | 8/1984 |
| GB | 2354602 A | 3/2001 |
| JP | 09-139289 | 5/1997 |
| WO | WO 81/00637 | 3/1981 |
| WO | WO 81/01602 | 6/1981 |
| WO | WO 86/05409 | 9/1986 |

OTHER PUBLICATIONS

AskOxford.com definition of Anticipate.*
American Heritage College Dictionary definition of program.*
International Search Report from PCT Application PCT/US01/19782.
"http://www.luminus.cx/projects/chaser", (Nov. 13, 2000), pp. 1-16.

* cited by examiner

METHOD AND APPARATUS FOR CONTROLLING A LIGHTING SYSTEM IN RESPONSE TO AN AUDIO INPUT

This application claims the benefit of provisional application Ser. No. 60/213,042 filed Jun. 21, 2000.

FIELD OF THE INVENTION

The present invention relates generally to methods and apparatus for controlling a lighting system, and more particularly to methods and apparatus for controlling a lighting system in response to an audio input.

BACKGROUND OF THE INVENTION

The increased accessibility of music in digital formats has led to the development of computer software to interpret digitally formatted music. The software enables the music to be broadcast using speakers and other audio components that can be coupled to a computer system. One example of such computer software is the MP3 players which allow music files in MP3 format to be interpreted and played by a user. Some MP3 player software provides the additional feature of an on-screen visual interface whereby the motion of graphics displayed to the user is synchronized with aspects of the music, such as frequency or tempo.

While such software has the benefit of providing a visual means for the appreciation of music, it does not allow for any type of visual display via a device peripheral to the computer system. It is an object of the present invention to provide methods and apparatus for controlling a lighting display in response to an audio input.

SUMMARY OF THE INVENTION

One embodiment of the invention is directed to a method for executing a lighting program to control a plurality of light emitting diodes (LEDs). The method comprises acts of: (A) receiving an audio input in digital form; (B) digitally processing the audio input to determine at least one characteristic of the audio input; (C) executing the lighting program to generate control signals to control the plurality of LEDs; and (D) during execution of the lighting program in the act (C), generating at least one of the control signals based at least in part on the at least one characteristic of the audio input.

Another embodiment of the invention is directed to a computer readable medium encoded with a program that, when executed, performs a method for executing a lighting program to control a plurality of LEDs. The method comprises acts of: (A) receiving an audio input in digital form; (B) digitally processing the audio input to determine at least one characteristic of the audio input; (C) executing the lighting program to generate control signals to control the plurality of LEDs; and (D) during execution of the lighting program in the act (C), generating at least one of the control signals based at least in part on the at least one characteristic of the audio input.

Another embodiment of the invention is directed to an apparatus for executing a lighting program to control a plurality of LEDs. The apparatus comprises at least one storage medium to store the lighting program; at least one input to receive an audio input; an audio decoder to digitally process the audio input to determine at least one characteristic of the audio input; and at least one controller, coupled to the audio decoder and the at least one storage medium, to execute the lighting program to generate control signals to control the plurality of LEDs. The at least one controller generates at least one of the control signals based at least in part on the at least one characteristic of the audio input.

Another embodiment of the invention is directed to a computer readable medium encoded with a first program that, when executed on a processor, performs a method for executing a lighting program to control a plurality of LEDs. The processor is programmed with a second program that processes an audio input to determine at least one characteristic of the audio input. The method comprises acts of: (A) receiving information from the second program relating to the at least one characteristic of the audio input; (B) executing the lighting program to generate control signals to control the plurality of LEDs; and (C) during execution of the lighting program in the act (B), generating at least one of the control signals based at least in part on the at least one characteristic of the audio input received from the first program.

Another embodiment of the invention is directed to a method for executing a lighting program to control a plurality of LEDs. The method comprises acts of: (A) receiving an audio input and an input from at least one timer; (B) analyzing the audio input to determine at least one characteristic of the audio input; (C) executing the lighting program to generate control signals to control the plurality of LEDs; and (D) during execution of the lighting program in the act (C), generating at least one of the control signals based at least in part on the at least one characteristic of the audio input and the input from the at least one timer.

Another embodiment of the invention is directed to a computer readable medium encoded with a program that, when executed, performs a method for executing a lighting program to control a plurality of LEDs. The method comprises acts of: (A) receiving an audio input and an input from at least one timer; (B) analyzing the audio input to determine at least one characteristic of the audio input; (C) executing the lighting program to generate control signals to control the plurality of LEDs; and (D) during execution of the lighting program in the act (C), generating at least one of the control signals based at least in part on the at least one characteristic of the audio input and the input from the at least one timer.

Another embodiment of the invention is directed to a computer readable medium encoded with a first program that, when executed on a processor, performs a method for executing a lighting program to control a plurality of LEDs. The processor is programmed with a second program that processes an audio input to determine at least one characteristic of the audio input. The method comprising acts of: (A) receiving information from the second program relating to the at least one characteristic of the audio input and an input from the at least one timer; (B) executing the lighting program to generate control signals to control the plurality of LEDs; and (C) during execution of the lighting program in the act (B), generating at least one of the control signals based at least in part on the at least one characteristic of the audio input and the input from the at least one timer.

Another embodiment of the invention is directed to an apparatus for executing a lighting program to control a plurality of LEDs. The apparatus comprises at least one storage medium to store the lighting program; at least one input to receive an audio input; an audio decoder to process the audio input to determine at least one characteristic of the audio input; and at least one controller, coupled to the audio decoder and the at least one storage medium, to execute the lighting program to generate control signals to control the plurality of LEDs. The at least one controller generates at least one of the control signals based at least in part on the at least one characteristic of the audio input and an input from at least one timer.

Another embodiment of the invention is directed to a method for executing a lighting program to control a plurality of LEDs. The method comprises acts of: (A) receiving an audio input and an input from a graphical user interface; (B) analyzing the audio input to determine at least one characteristic of the audio input; (C) executing the lighting program to generate control signals to control the plurality of LEDs; and (D) during execution of the lighting program in the act (C), generating at least one of the control signals based at least in part on the at least one characteristic of the audio input and the input from the graphical user interface.

Another embodiment of the invention is directed to a method for execution on a computer. The method comprises acts of: (A) processing, on the computer, information indicative of an audio signal to generate a speaker-compatible signal indicative of the audio signal; (B) determining at least one characteristic of the audio signal; (C) executing, on the computer, a lighting program to generate control signals to control a plurality of LEDs; (D) during execution of the lighting program in the act (C), generating at least one of the control signals based at least in part on the at least one characteristic of the audio input; and (E) transmitting the speaker-compatible signal to a speaker to generate audible sound indicative of the audio signal.

Another embodiment of the invention is directed to a method for authoring a lighting program to control a plurality of LEDs is response to at least one characteristic of an audio input. The method comprises acts of: (A) providing a graphical user interface (GUI) that displays information representative of the plurality of LEDs, a plurality of lighting effects to be assigned thereto, and the at least one characteristic of the audio input (B) selecting, based on at least one user input provided via the GUI, at least one of the plurality of lighting effects to correspond to at least one of the plurality of LEDs in response to the at least one characteristic of the audio input; and (C) creating a lighting program, based on the at least one user input, for generating control information for the plurality of LEDs.

Another embodiment of the invention is directed to a method for executing a lighting program to control a plurality of LEDs. The method comprises acts of: (A) receiving an audio input; (B) analyzing the audio input to determine at least one characteristic of the audio input; (C) storing information related to the at least one characteristic of the audio input; (D) executing the lighting program, after completion of the act (C), to generate control signals to control the plurality of LEDs; and (E) during execution of the lighting program in the act (D), reading the stored information and generating at least one of the control signals based at least in part on the at least one characteristic of the audio input.

Another embodiment of the invention is directed to a method for executing a lighting program to control a plurality of LEDs to create a light show. The method comprises acts of: (A) receiving an audio input having a duration and varying in time during the duration of the audio input; (B) processing the audio input to determine at least one first characteristic of the audio input at a first time during the duration; (D) executing the lighting program in synchronization with the audio input to generate control signals to control the plurality of LEDs; and (D) during execution of the lighting program in the act (C) at a time that is prior to the first time during the duration of the audio input, generating at least one of the control signals based at least in part on the least one first characteristic of the audio input so that the light show anticipates changes in the audio input.

DETAILED DESCRIPTION

As mentioned above, while music player software provides a convenient means of translating digitally formatted music for listening, and in some cases also provides a screen-based graphical interface for visually appreciating music, existing programs have limited functionality with respect to the visualization of music. For example, existing music player software does not allow for the visual display of music external to the computer. Such an external display would provide increased music-based feedback, thereby enhancing a user's overall sensory experience.

One embodiment of the present invention is directed to a method and apparatus for controlling a lighting network in response to an audio input. This can be accomplished in any of numerous ways, as the present invention is not limited to any particular implementation technique. In accordance with one illustrative embodiment, an audio input is digitally processed to analyze the audio input, and at least one aspect of a lighting system is controlled in response to a characteristic of the audio input. In another embodiment of the present invention, timing information is also considered so that the control signals sent to the lighting network for a particular audio input can vary over time, to avoid repetitiveness.

The assignee of the present application has previously developed other systems on which users can author lighting programs including one more lighting sequences, as well as devices for playing back a lighting program to control a lighting system. Many of the features of those systems can be incorporated in the present invention to enable the control of a lighting system in response to an audio input. Therefore, a description will initially be provided of authoring software and playback devices for lighting programs to control a lighting system, before turning to the specific aspects of the present invention relating to performing such control in response to an audio input.

Figure 1:
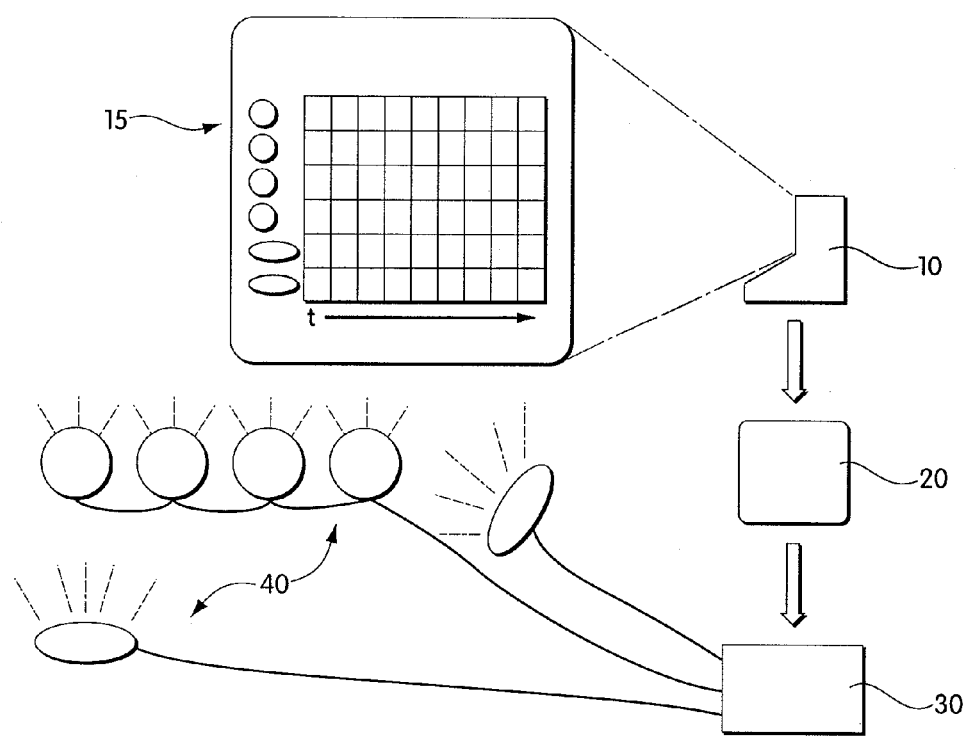
FIG. 1 illustrates a system for creating a lighting sequence and executing the lighting sequence on a plurality of lighting units according to one embodiment of the invention.

Overview of Systems for Authoring and Playing Back Lighting Programs to Control A Lighting Network FIG. 1 illustrates an example of a system for authoring and playing back a lighting program including one more lighting sequences. The system of FIG. 1 includes a processor 10 supporting a software application, having an interface 15, which can be used to create a lighting program 20, which may include one or more lighting sequences. The system further includes a lighting controller 30 which can execute or play back the lighting sequence 20 and in response thereto, control one or more lighting units 40. The term "sequence" in the context of this disclosure refers to two or more lighting effects spaced in time.

The software application may be implemented in any of numerous ways, as the invention is not limited to any particular implementation. For example, the software application may be a stand-alone application, such as an executable image of a C++ or Fortran program or other executable code and/or libraries, or may be implemented in conjunction with or accessible by a Web browser, e.g., as a Java applet or one or more HTML web pages, etc. Processor 10 may be any system for processing in response to a signal or data, as the present invention is not limited to any particular type of processor. For example, the processor 10 may comprise microprocessors, microcontrollers, other integrated circuits, computer software, computer hardware, electrical circuits, application-specific integrated circuits, personal computers, chips, and other devices alone or in combination capable of providing processing functions. For example, processor 10 can be any suitable data processing platform, such as a conventional IBM PC workstation operating the Windows operating system, a SUN workstation operating a version of the Unix operating system, such as Solaris, or any other suitable workstation.

Controller 30 may communicate with lighting units 40 by radio frequency (RF), ultrasonic, auditory, infrared (IR), optical, microwave, laser, electromagnetic, any type of computer link (e.g., a network) or any other suitable transmission or connection technique. A suitable protocol may be used for transmission between the controller 30 and the lighting units 40, including sending pulse-width modulated signals over a protocol such as DMX, RS-485, RS-232, or any other suitable protocol. Lighting units 40 may be incandescent, LED, fluorescent, halogen, laser, or any other type of light source. Each lighting unit may be associated with a predetermined assigned address either unique to that lighting unit or overlapping the address of other lighting units to facilitate communication with the controller 30.

It should be appreciated from the foregoing, in one embodiment of the present invention, control signals for driving the lighting units 40 can take the form of pulse-width modulated signals. Thus, the lighting units 40 may be driven with a fixed current or voltage that is then turned on or off in accordance with a pulse-width modulated control signal. Alternatively, the lighting units 40 may be driven using analog techniques where the current or voltage level is varied with time, pulse amplitude modulation or any other technique that varies the power through the lighting units in response to a control signal.

In certain embodiments, a single component may be capable both of permitting a user to create a lighting program and controlling the lighting units, and the present invention is intended to encompass this and other variations on the system depicted in FIG. 1 which can be used to implement the methods described below. For example, the processor 10 can have software loaded thereon to enable it to perform not only the authoring functions described below, but also the playback functions described below as being performed by the controller 30. In certain embodiments, the functions described below as being performed by the software application alternatively may be provided by a hardware device, such as a chip or card, or any other system capable of performing the functions described herein.

Figure 2:
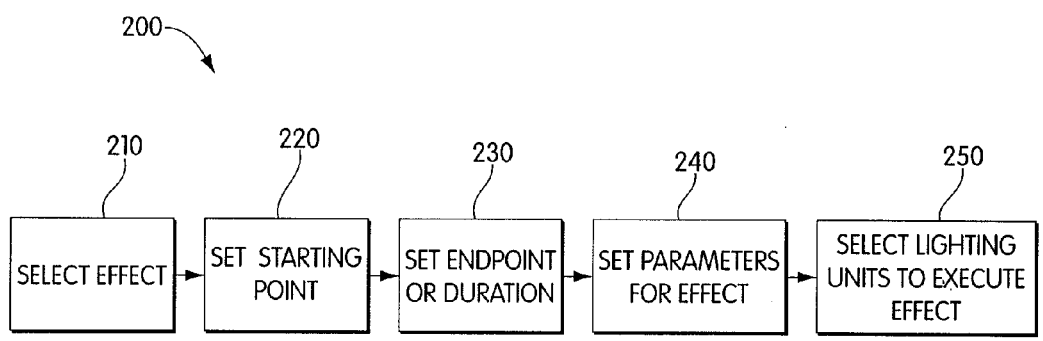
FIG. 2 presents an exemplary method for creating a lighting effect in accordance with one embodiment of the invention.

An illustrative method 200 for creating a lighting sequence is described making reference to FIG. 2. According to the method, a user may select from among a set of predetermined 'stock' effects at step 210. The stock effects function as discrete elements or building blocks useful for assembling a sequence. Additionally, a user may compose a particular sequence and include that sequence in the stock effects to eliminate the need for creating repeated elements each time the effect is desired. For example, the set of stock effects may include a dimming effect and a brightening effect. A user may compose a pulse effect by specifying the alternation of the dimming and brightening effects, and include the pulse effect in the set of stock effects. Thus, each time a pulse effect is thereafter desired, the stock effect can be utilized without the need for repeatedly selecting dimming and brightening effects to achieve the same goal. In certain embodiments, stock effects may be created by a user via any programming language, such as Java, C, C++, or any other suitable language. Effects may be added to the set of stock effects by providing the effects as plug-ins, by including the effects in an effects file, or by any other technique suitable for organizing effects in a manner that permits adding, deleting, and altering the set of effects.

The user may indicate a time at which the selected effect should begin at step 220. For example, the user may indicate that a brightening effect should start three minutes after a sequence commences. Additionally, the user may select an ending time or duration for the selected effect at step 230. Thus, by indicating that the effect should end five minutes after the sequence commences, or equivalently by indicating that the effect should last for two minutes, a user may set the time parameters of the selected effect. Additional parameters may be specified by the user at step 240, as may be appropriate for the particular effect. For example, a brightening or dimming effect may be further defined by an initial brightness and an ending brightness. The rate of change may be predetermined, e.g., the dimming effect may apply a linear rate of dimming over the assigned timespan, or may be alterable by the user, e.g., may permit slow dimming at the beginning followed by a rapid drop-off, or by any other scheme the user specifies. Similarly, a pulse effect, as described above, might instead be characterized by a maximum brightness, a minimum brightness, and a periodicity, or rate of alternation. Additionally, the mode of alternation may be alterable by the user, e.g., the changes in brightness may reflect a sine function or alternating linear changes. In embodiments wherein color-changing lights are employed, parameters such as initial color, final color, rate of change, etc. may be specified by the user. It should be appreciated that the particular effects and parameters therefore described above are provided merely for illustrative purposes, and that the present invention is not limited to these effects or parameters, as numerous other lighting effects and parameters can be employed in accordance with the embodiments of the invention described herein.

Finally, the user may select, at step 250, one or more lighting units to execute the effect selected in step 210.

In certain embodiments, a user may specify a transition between two effects which occur in sequence. For example, when a pulse effect is followed by a dimming effect, the pulse effect may alternate less rapidly, grow gradually dimmer, or vary less between maximum and minimum brightness towards the termination of the effect. Techniques for transitioning between these or other effects may be determined by the user for each transition, e.g., by selecting a transition effect from a set of predetermined transition effects, or by setting transition parameters for the beginning and/or end of one or both effects.

In a further embodiment, users may specify multiple lighting effects for the same lighting unit that place effects overlapping in time or in location. These overlapping effects may be used in an additive or subtractive manner such that the multiple effects interact with each other. For example, a user could impose a brightening effect on a pulsing effect, with the brightening effect imposing the minimum brightness parameter of the pulse to give the effect of pulsing slowly growing to a steady light.

In one embodiment of the invention, lighting effects can have priorities or cues attached to them which could allow a particular lighting unit to change effect on the receipt of a cue. This cue could be any type of cue, received externally or internally to the system, and includes, but is not limited to, a user-triggered cue such as a manual switch or bump button; a user-defined cue such as a certain keystroke combination or a timing key allowing a user to tap or pace for a certain effect; a cue generated by the system such as an internal clocking mechanism, an internal memory one, or a software based one; a mechanical cue generated from an analog or digital device attached to the system such as a clock, external light or motion sensor, music synchronization device, sound level detection device, or a manual device such as a switch; a cue received over a transmission medium such as an electrical wire or cable, RF signal or IR signal; a cue that relates to a characteristic of an audio signal; or a cue received from a lighting unit attached to the system. The priority can allow the system to choose a default priority effect that is the effect used by the lighting unit unless a particular cue is received, at which point the system instructs the use of a different effect. This change of effect could be temporary, occurring only while the cue occurs or defined for a specified period, could be permanent in that it does not allow for further receipt of other effects or cues, or could be priority based, waiting for a new cue to return to the original effect or select a new one. Alternatively, the system could select effects based on the state of a cue and the importance of a desired effect. For instance, if a sound sensor sensed sudden noise, it could trigger a high priority alarm lighting effect overriding all the effects otherwise present or awaiting execution. The priority could also be state dependent where a cue selects an alternative effect or is ignored depending on the current state of the system. Again, it should be appreciated that the embodiments of the present invention that employ priorities or queues for various lighting effects are not limited to the particular types of queues and priorities discussed above, as numerous other types are possible.

In certain embodiments, the outcome of one effect may be programmed to depend upon a second effect. For example, an effect assigned to a first lighting unit may be a random color effect, and an effect assigned to a second lighting unit may be designated to match the color of the random color effect. Alternatively, one lighting unit may be programmed to execute an effect, such as a flashing effect, whenever a second lighting unit meets a certain condition, such as being turned off. Even more complex arrangements, such as an effect which is initiated upon a certain condition of a first effect, matches the color of a second effect and the rate of a third effect, can be created by this scheme. It should be appreciated that the above-described examples of combinations of effects or parameters being dependent upon other effects or parameters is provided merely for illustrative purposes, as the present invention is not limited to these specific examples, as numerous other dependencies and combinations are possible.

In still other embodiments, the systems and methods described herein permit the playback of a lighting sequence to be influenced by external inputs during performance such as any of the examples of cues described above. For example, a lighting sequence or effect may be programmed to start upon receipt of a cue or trigger signal, a sequence or effect may take precedence if a cue or trigger signal is received, a sequence or effect may be designated to repeat or continue until a cue or trigger signal is received, etc. Thus, instead of assigning a discrete start time to an effect or sequence, a user may instead designate that effect or sequence to begin when a certain stimulus is received. Furthermore, during creation, a user may designate two or more effects for overlapping or concurrent time periods and assign the effects different priorities or conditions to determine which effect is executed upon playback. In yet another embodiment, a user may link a parameter for an effect to an external input (e.g., any of the types of inputs described above, including analog, digital or manual inputs) such that the color, speed, or other attribute of an effect may depend on a signal from an external device, measuring, for example, volume, brightness, temperature, pitch, inclination, wave length, or any other appropriate condition. Thus, the selection of a lighting sequence, the selection of an effect, or the selection of a parameter may be determined or influenced by input from an external source, such as a user, chronometer, device, audio source, or sensor. Of course, the types of external stimuli, cues and triggers described above, as well as the changes in a lighting effect or parameter influenced thereby, are provided merely for illustrative purposes, as numerous other variations are possible.

In event-driven embodiments, such as those using external inputs and those using outputs of other effects as inputs, a menu may be provided to define inputs and the consequences thereof. For example, a palette of predetermined inputs may be provided to a user. Each input, such as a specified transducer or the output of another effect, may be selected and placed within an authored lighting sequence as a trigger for a new effect, or as a trigger to a variation in an existing effect. Known inputs may include, for example, thermistors, clocks, keyboards, numeric keypads, Musical Instrument Digital Interface ("MIDI") inputs, DMX control signals, TTL or CMOS logical signals, other visual or audio signals, or any other protocol, standard, or other signaling or control technique, whether analog, digital, manual, or any other form. The palette may also include a custom input, represented as, for example, an icon in a palette, or an option in a dropdown menu. The custom input may allow a user to define the characteristics of an input signal (e.g., its voltage, current, duration, and/or form (i.e., sinusoid, pulse, step, modulation)) that will operate as a control or trigger in a sequence.

For instance, a theatrical lighting sequence may include programmed lighting sequences and special effects in the order in which they occur, but requiring input at specified points before the next sequence or portion thereof is executed. In this way, scene changes may take place not automatically as a function of timing alone, but at the cue of a director, producer, stage hand, or other participant. Similarly, effects which need to be timed with an action on the stage, such as brightening when an actor lights a candle or flips a switch, dramatic flashes of lightning, etc., can be indicated precisely by a director, producer, stage hand, or other participant—even an actor—thereby reducing the difficulty and risk of relying on preprogrammed timing alone.

As should be appreciated from the foregoing, input from sensors can also be used to modify lighting sequences. For example, a light sensor may be used to modify the intensity of the lights, for example, to maintain a constant lighting level regardless of the amount of sunlight entering a room, or to make sure a lighting effect is prominent despite the presence of other sources of light. A motion sensor or other detector may be used as a trigger to start or alter a lighting sequence. For example, a user may program a lighting sequence for advertising or display purposes to change when a person approaches a sales counter or display. Temperature sensors may also be used to provide input. For example, the color of light in a freezer may be programmed to be dependent on temperature, e.g., providing blue light to indicate cold temperature, changing gradually to red as the temperature rises, until a critical temperature is reached, whereupon a flashing or other warning effect may begin. Similarly, an alarm system may be used to provide a signal that triggers a lighting sequence or effect for providing a warning, distress signal, or other indication. An interactive lighting sequence may be created, e.g., wherein the executed effect varies according to a person's position, movements, or other actions. It should be appreciated that the types of sensors described herein, and their modifying effect on a light sequence, are provided merely for illustrative purposes, as numerous other types of sensors can be employed, and numerous other lighting effects or parameters can be modified in response to inputs from these or other types of sensors.

Figure 3:
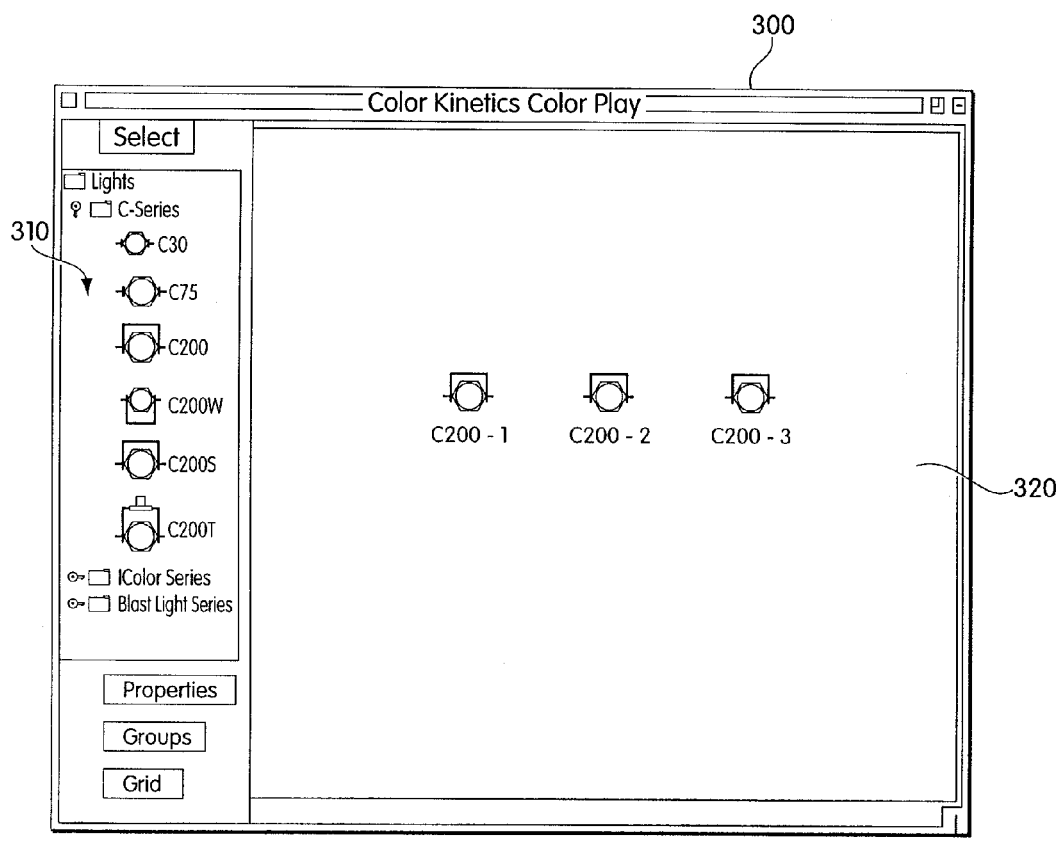
FIG. 3 depicts a representative interface for describing an arrangement of lighting units in accordance with another embodiment of the invention.

In certain embodiments, a user may provide information representative of the number and types of lighting units and the spatial relationships between them. For example, an interface 300 may be provided as depicted in FIG. 3, such as a grid or other two-dimensional array, that permits the user to arrange icons or other representative elements to represent the arrangement of the lighting units being used. In one embodiment, depicted in FIG. 3, the interface 300 provides to a user a selection of standard types of lighting units 310, e.g., cove lights, lamps, spotlights, etc., such as by providing a selection of types of lighting units in a menu, on a palette, on a toolbar, etc. The user may then select and arrange the lighting units on the interface, e.g., within layout space 320 in an arrangement which approximates the physical arrangement of the actual lighting units. It should be appreciated that numerous different types of user interfaces can be employed, and that the embodiments of the present invention described herein are not limited to the use of any particular user interface, or any specific technique for representing the number and types of lighting units and their spatial relationship.

In certain embodiments, the lighting units may be organized into different groups, e.g., to facilitate manipulation of a large number of lighting units. Lighting units may be organized into groups based on spatial relationships, functional relationships, types of lighting units, or any other scheme desired by the user. Spatial arrangements can be helpful for entering and carrying out lighting effects easily. For example, if a group of lights are arranged in a row and this information is provided to the system, the system can then implement effects such as a rainbow or a sequential flash without need for a user to specify a separate and individual program for each lighting unit. All the above types of implementation or effects could be used on a group of units as well as on single lighting units. The use of groups can also allow a user to enter a single command or cue to control a predetermined selection of lighting units.

A lighting sequence can be tested or executed on a lighting system to experience the effects created by the user. Additionally, the interface 300 may be capable of reproducing a lighting sequence created by the user, for example, by recreating the programmed effects as though the icons on the interface were the lighting units to be controlled. Thus, if a lighting sequence specified that a certain lighting unit gradually brightens to a medium intensity, upon playback, the icon representing that lighting unit may start black and gradually lighten to gray. Similarly, color changes, flashing, and other effects can be visually represented on the interface. This function may permit a user to present a wholly or partially created lighting sequence on a monitor or other video terminal, pause playback, and modify the lighting sequence before resuming playback, to provide a highly interactive method for show creation. In a further embodiment, the system could allow fast-forwarding, reversing, rewinding, or other functions to allow editing of any portion of the lighting sequence. In a still further embodiment, the system could use additional interface features like those known in the art. This can include, but is not limited to, non-linear editing such as that used in the Adobe or such devices or controls as scrolls, drag bars, or other devices and controls.

Figure 4:
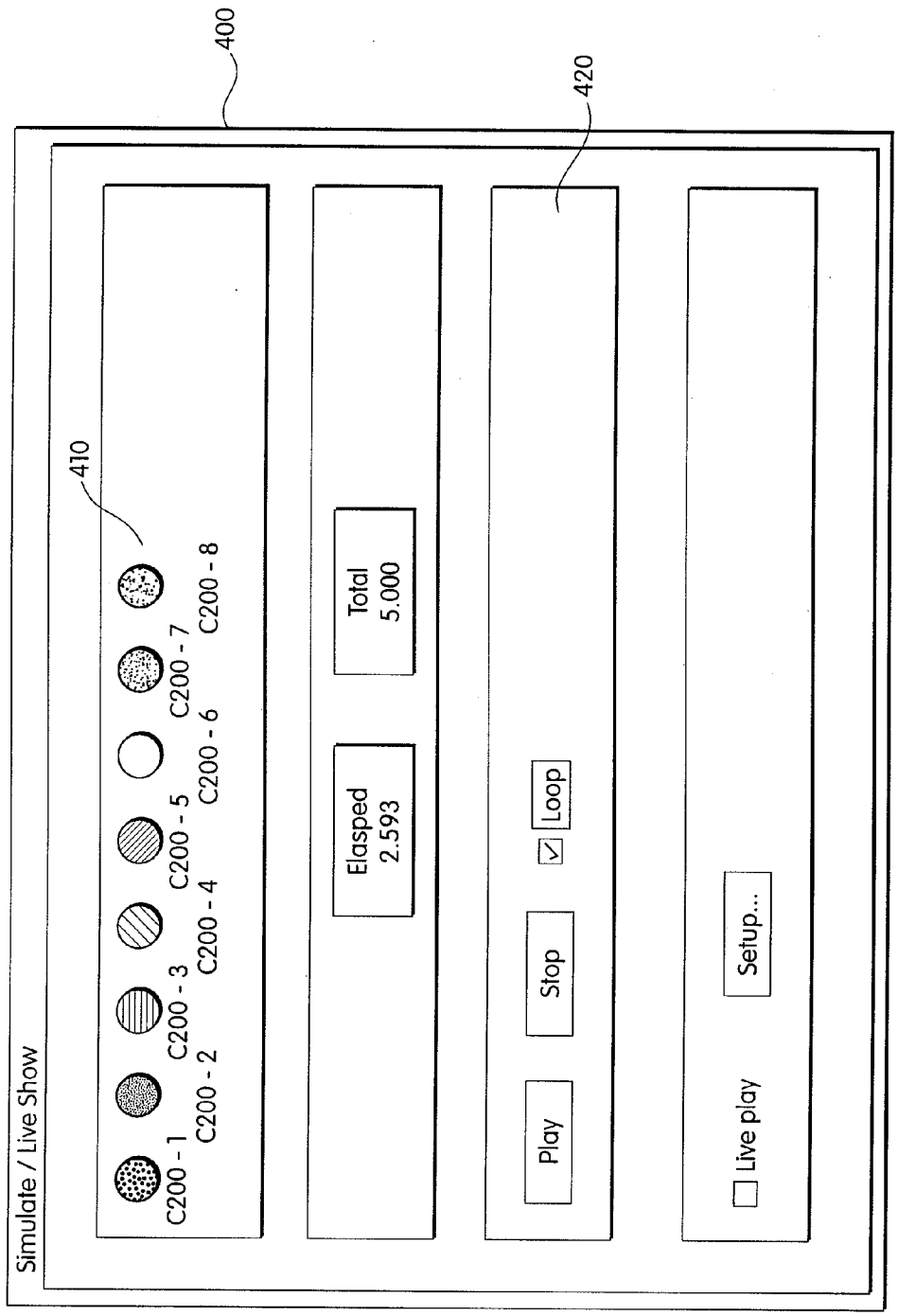
FIG. 4 represents an alternate interface for graphically reproducing a lighting sequence.

An alternate interface 400 for reproducing a lighting sequence is presented in FIG. 4. Interface 400 includes representations of lighting elements 410 and playback controls 420. It should be appreciated that the present invention is not limited to the above-described techniques for visualizing a lighting sequence, as numerous other techniques are possible.

Figure 5:
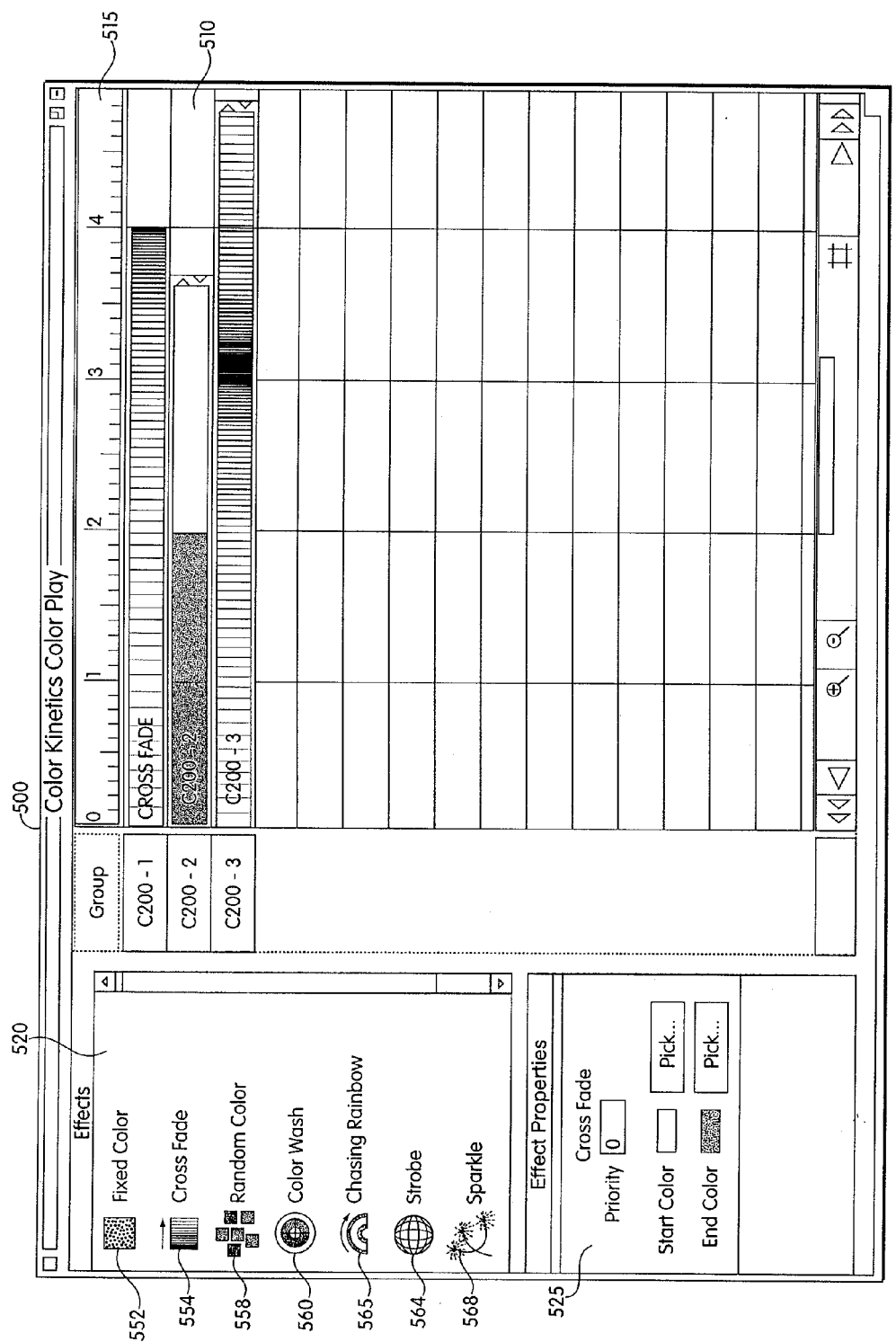
FIG. 5 portrays a representative interface for creating a lighting sequence in accordance with one embodiment of the invention.

An interface capable of representing the lighting sequence may also be used during authoring or entry of the lighting sequence. For example, a grid, such as interface 15 of FIG. 1, may be employed, wherein available lighting units are represented along one axis and time is represented along a second axis. Thus, when a user specifies that a certain lighting unit gradually brightens to a medium intensity, the portion of the grid defined by that lighting unit, the start time, and the ending time may appear black at one end of the grid portion and gradually lighten to gray at the other end of the grid portion. In this way, the effect can be visually represented to the user on the interface as the lighting sequence is being created. In certain embodiments, effects that are difficult to represent with a static representation, such as flashing, random color changes, etc., can be represented kinetically on the interface, e.g., by flashing or randomly changing the color of the defined grid portion. An example of an interface 500 representing a sequence for an assortment of three lighting units is shown in FIG. 5. Time chart 510 visually depicts the output of each of the three lights at each moment in time according to the temporal axis 515. At a glance, the user can readily determine what effect is assigned to any lighting unit at any point in time, simplifying the coordination of effects across multiple lighting units and allowing rapid review of the lighting sequence.

Additionally, FIG. 5 depicts a palette 520 which includes the stock effects from which a user may select lighting effects, although other techniques for providing the set of stock effects, such as by a menu, toolbar, etc., may be employed in the systems and methods described herein. In palette 520 there are provided icons for stock effects for the lighting of a fixed color effect 552, a cross fade between two color effects 554, a random color effect 558, a color wash effect 560, a chasing rainbow effect 565, a strobe effect 564, and a sparkle effect 568. This list is by no means exhaustive and other types of effects can be included. To assign an effect to a lighting unit, the user may select an effect from the palette and select a region of the grid corresponding to the appropriate lighting unit or units and the desired time interval for the effect. Additional parameters may be set by any suitable technique, such as by entering numerical values, selecting options from a palette, menu, or toolbar, drawing a vector, or any other technique known in the art, such as the parameter entry field 525. Other interfaces and techniques for entry of lighting sequences suitable for performing some or all of the various functions described herein may be used and are intended to be encompassed by the scope of this disclosure. Examples of functions and interfaces suitable for use with the invention may be found in "A Digital Video Primer," June, 2000, by the Adobe Dynamic Media Group, Adobe Systems, Inc., incorporated herein by reference.

The methods described above can be readily adapted for controlling devices other than lighting units. For example, in a theatrical setting, fog machines, sound effects, wind machines, curtains, bubble machines, projectors, stage practicals, stage elevators, pyrotechnical devices, backdrops, and any other features capable of being controlled by a computer may be controlled by a sequence as described herein. In this way, multiple events can be automated and timed. For example, the user may program the lights to begin to brighten as the curtain goes up, followed by the sound of a gunshot as the fog rolls over the stage. In a home, for example, a program can be used to turn on lights and sound an alarm at 7:00 and turn on a coffee maker fifteen minutes later. Holiday lighting arrays, e.g., on trees or houses, can be synchronized with the motion of mechanical figurines or musical recordings. An exhibit or amusement ride can coordinate precipitation, wind, sound, and lights in a simulated thunderstorm. A greenhouse, livestock barn, or other setting for growing living entities can synchronize ambient lighting with automated feeding and watering devices. Any combination of electromechanical devices can be timed and/or coordinated by the systems and methods described herein. Such devices may be represented on an interface for creating the sequence as additional lines on a grid, e.g., one line for each separate component being controlled, or by any other suitable means. Effects of these other devices can also be visually represented to the user. For instance, continued use of a smoke machine could slowly haze out other grids, a coffee maker could be represented by a small representation of a coffee maker that appears to brew coffee on the interface as the action occurs at the device or the interface can show a bar slowing changing color as feed is dispensed in a livestock barn. Other types of static or dynamic effects are also possible.

In certain embodiments, wherein the lighting units are capable of motion, e.g., by sliding, pivoting, rotating, tilting, etc., the user may include instructions for the motion or movement of lighting units. This function may be accomplished by any means. For example, if the lighting unit includes a motor or other system capable of causing movement, the desired movement may be effected by selecting a motion effect from a set of motion effects, as described for lighting effects above. Thus, for example, a lighting unit capable of rotating on its base may be selected, and a rainbow wash effect may be programmed to occur simultaneously with a rotating motion effect. In other embodiments, lighting units may be mounted on movable platforms or supports which can be controlled independently of the lights, e.g., by providing an additional line on a grid interface as described above. Motion effects may also have parameters, such as speed and amount (e.g., an angle, a distance, etc.), that can be specified by the user. Such light/motion combinations may be useful in a wide variety of situations, such as light shows, planetarium presentations, moving spotlights, and any other scenario in which programmable moving lights may be desirable.

Similarly, instructions for controlling objects placed between a lighting unit and an object being illuminated, such as gobos, stencils, filters, lenses, irises and other objects through which light may pass, can be provided by a user according to the systems and methods described herein. In this manner, an even wider array of lighting effects may be designed and preprogrammed for later execution.

One embodiment of the present invention is directed to a computer system configured to design or create a lighting sequence according to the systems and methods described herein, e.g., by executing (e.g., on the processor 10 in FIG. 1) a computer program in a computer language, either interpreted or compiled, e.g., Fortran, C, Java, C++, etc. Another embodiment of the invention is directed to a disk, CD, or other computer-readable storage medium that encodes a computer program that, when executed, is capable of performing some or all of the functions described above which enable a user to create or design a lighting sequence which can be used to control a plurality of lighting units.

A lighting sequence may be recorded on a storage medium, such as a compact disk, floppy disk, hard drive, magnetic tape, volatile or non-volatile solid state memory device, or any other computer-readable storage medium. The lighting sequence may be stored in a format that records the effects and their parameters as created by a user, in a format converted from that format into a format which represents the final data stream, e.g., suitable for directly controlling lighting units or other devices, or in any other suitable format. In this respect, it should be appreciated that the format in which a lighting sequence is created in any of the manners described above may not be compatible for directly controlling a lighting network, such that some format conversion may be required between the format used for creating the lighting sequence, and a format for controlling a plurality of lighting units. When such a conversion is desired, it can be performed at various different times, as the embodiments of the present invention described herein are not limited to any particular conversion time or technique. Thus, the lighting sequence can be recorded on a storage medium either in the format in which it was created, in a format suitable for controlling a lighting network (such that the conversion will take place before storing the lighting sequence), or any other suitable format. Examples of formats that can be used for controlling a plurality of lighting units include data streams in data formats such as DMX, RS-485, RS-232, etc.

It should be appreciated that lighting sequences may be linked to each other, e.g., such that at the conclusion of one sequence, another sequence is executed, or a master sequence may be created for coordinating the execution of a plurality of subsequences, e.g., based on external signals, conditions, time, randomly, etc.

Playback Devices

In one embodiment of the present invention, the same system that is used to author a lighting sequence can also be used to play it back and thereby control a plurality of lighting units 40. For example, when the lighting program is authored on a general purpose computer, (e.g., including a display that comprises the interface 15 and a processor that serves as the processor 10 shown in FIG. 1), that same general purpose computer can playback the lighting program, and thereby perform the functions of the lighting controller 30 shown in FIG. 1. In this respect, the general purpose computer can be coupled to the plurality of lights 40 in any suitable manner, examples of which are discussed above.

It should be appreciated that in many instances, it may be desirable to author a lighting program on one device (e.g., a general purpose computer), but play it back on a different device. For example, a retail store may desire to author a lighting program that can then be played back at multiple retail locations. While it is possible to interconnect multiple locations to the device on which the lighting program was authored (e.g., over the Internet), it may be desirable in some circumstances to have each of the retail locations be capable of controlling playback of the lighting program individually. Furthermore, there may also be situations where lighting displays are mobile, such that it is not assured that in every location wherein it is desired to set up a lighting display that there will be access to the Internet or some other communication medium for connecting to the device on which the program is authored. In addition, it should be appreciated that it may be desirable for an organization to have only a single device with the capability of authoring a lighting program (i.e., having a display, relevant software, etc.), on which numerous different lighting programs can be authored. If playback of the lighting program were limited to the device on which it was authored, then only one of potentially numerous programs authored on a particular device could be played back at a time, which would severely restrict the usefulness of the system.

In view of the foregoing, one embodiment of the present invention is directed to a system in which lighting programs are authored on one device as described above, and then transferred to a different device which plays back the lighting program and controls a lighting display. In accordance with one illustrative embodiment of the invention, the separate playback device can be a general purpose computer, with software loaded thereon to enable it to playback the lighting program. The transfer of the lighting program from the device on which it is authored to the device on which it is played back can be accomplished in any of numerous ways, such as by connection over a communication medium (e.g., via email over the Internet), or by loading the lighting program onto a portable computer readable medium (e.g., a disk, flash memory or CD) and physically transporting the medium between the two devices.

In accordance with an alternate embodiment of the invention, Applicants have appreciated that the device used to playback a lighting program need not have all of the functionality and capability of the device used in authoring the program (e.g., it need not include a video monitor, a robust user interface, etc.). Furthermore, Applicants have appreciated that in many instances, it would be desirable to provide a relatively small and inexpensive device to perform the playback function, so that the device can be portable and such that if there are multiple instances of lighting systems on which a program is to be played back, separate devices can be used to control the playback on each of the lighting systems, to increase flexibility.

In view of the foregoing, one embodiment of the present invention is directed to a device, for playing back a lighting program, that includes less hardware and is less expensive than a more complex system that permits authoring of the lighting program. For example, the device need not include a lot of the functionality found in a general purpose computer, such as a full size display, a full alphanumeric keyboard, an operating system that enables processing of multiple applications simultaneously, etc. The playback device can take any of numerous forms, as the present invention is not limited to any particular implementation.

Figure 6:
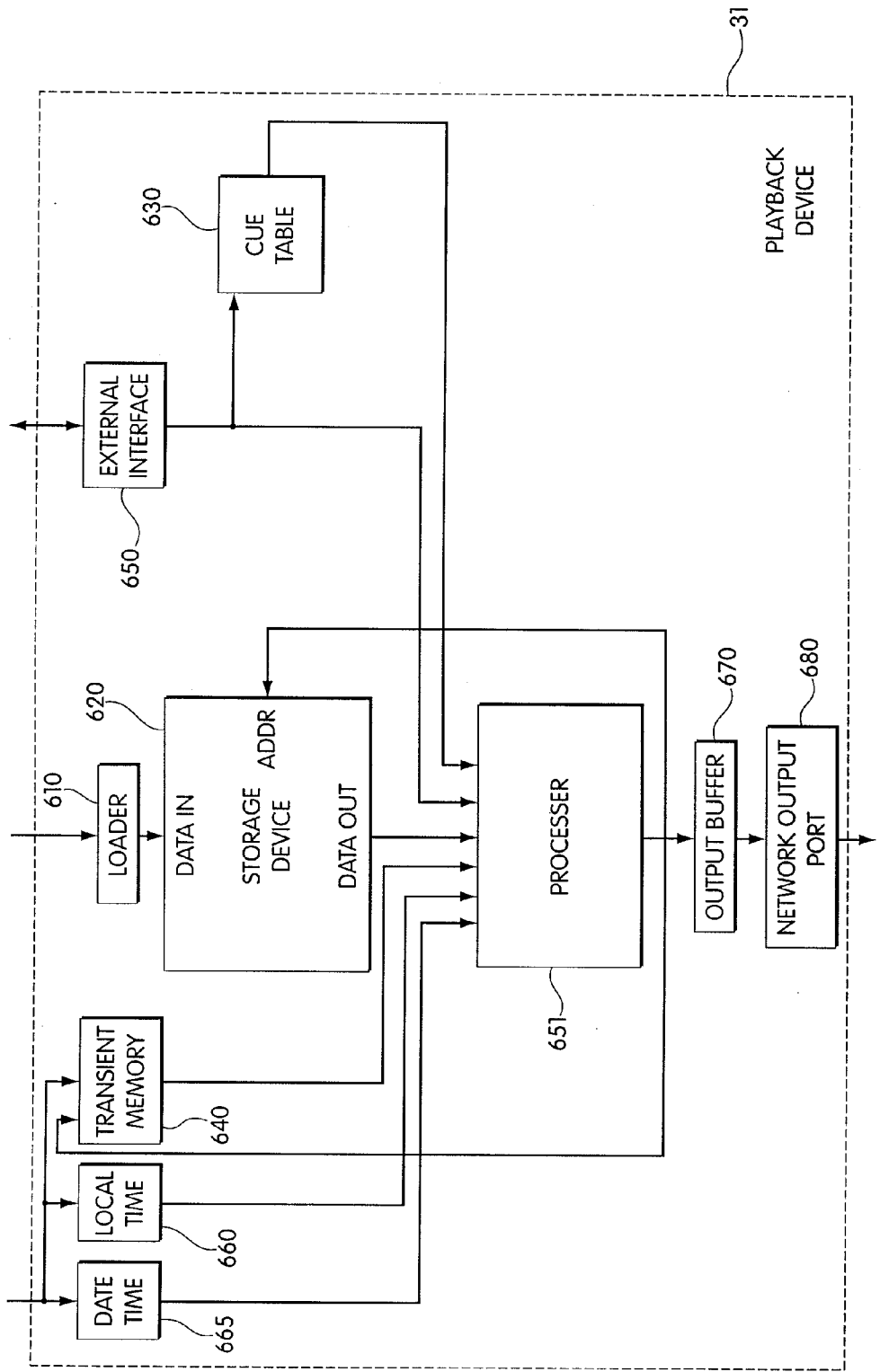
FIG. 6 shows one embodiment of an apparatus for executing a lighting sequence in accordance with another embodiment of the invention.

One illustrative implementation of a playback device 31 is shown in FIG. 6. The playback device 31 may employ any suitable loader interface 610 for receiving a lighting program 20, e.g., an interface for reading a lighting program 20 from a storage medium such as a compact disk, diskette, magnetic tape, smart card, or other device, or an interface for receiving a transmission from another system, such as a serial port, USB (universal serial bus) port, parallel port, IR receiver, or other connection for receiving a lighting program 20. In certain embodiments, the lighting program 20 may be transmitted over networks (e.g., the Internet).

The components on the playback device 31 can be powered in any of numerous ways, including through the provision of a power source (e.g., a battery) within the playback device, or through the provision of an interface for receiving a power cord compatible with a standard electrical outlet. However, in accordance with one illustrative embodiment of the present invention, the playback device 31 is provided with neither an onboard power source nor an interface for a standard electrical outlet. Thus, in accordance with one illustrative embodiment of the invention, the interfaces for connecting the playback device 31 to both a device that authors a lighting program (e.g., a general purpose computer with software loaded thereon to perform the above-described functions) and for connecting with one or more lighting units 40 provide an interface that enables not only the transfer of data or other communication signals, but also sufficient electrical current to power the components within the playback device 31, thereby eliminating the need for a separate power interface. The present invention is not limited to the use of any particular type of interface. One example of a suitable interface that provides both communication and power is a USB port.

The playback device 31 may begin execution of a lighting sequence 20 upon the loading the lighting sequence 20 into the device 31, upon receiving a command or signal from a user interface, another device, or a sensor; at a specified time; or upon any other suitable condition. The condition for initiation may be included in the lighting sequence 20, or may be determined by the configuration of the playback device 31. Additionally, in certain embodiments, the playback device 31 may begin execution of a lighting sequence 20 at a starting point other than the beginning of the lighting sequence 20. For example, playback device 31 may, upon receiving a request from the user, execute a lighting sequence 20 starting from a point three minutes from the beginning of the sequence, or at any other specified point, e.g., from the fifth effect, etc. In one embodiment, the playback device 31 may, upon receiving a signal from a user, a device or sensor, pause the playback, and, upon receiving a suitable signal, resume playback from the point of pausing. The playback device 31 may continue to execute the lighting sequence 20 until the sequence terminates, or it may repeatedly replay the sequence until a command or signal is received from a user, device or sensor, until a specified time, or until any other suitable condition.

The playback device 31 may include a storage device 620, such as a memory unit, database, or other suitable module (e.g., a removable Flash memory), for storing lighting information. In accordance with one embodiment of the present invention, the storage device 620 is formed as a non-volatile memory device, such that once information is stored thereon, the information is maintained, even when no power is provided to the playback device 31. The lighting information may take any of many forms. For example, the storage device 620 may store a plurality of effects and instructions for converting those effects into a data format or protocol, such as DMX, RS-485, or RS-232, suitable for controlling a plurality of lighting units 40. The storage device 620 may be preconfigured for a set of stock effects, may receive effects and instructions in the form of an authored lighting sequence 20, or the storage device 620 may include a preconfigured set of stock effects which can be supplemented by additional effects provided in an authored lighting sequence 20. Preconfiguring the storage device 620 with a set of stock effects permits a reduction in the memory required to store a lighting sequence 20, because the lighting sequence 20 may omit conversion instructions for effects preconfigured into the playback device 31. In embodiments wherein the lighting sequence 20 includes stock effects designed by the author, suitable instructions may be included in lighting sequence 20 and stored in storage device 620, e.g., upon loading or execution of the lighting sequence 20. It should be appreciated that the information stored within the storage device 620 need not be stored in the form of lighting effects and instructions for converting those effects into a data format suitable for controlling a plurality of light units, as such a conversion can be performed prior to storing the information in the storage device 620.

As mentioned above, in one embodiment of the present invention, a lighting program may be transformed and stored on a storage medium (e.g., storage device 620) in a format which represents the final data stream suitable for directly controlling lighting units or other devices. It should be appreciated that during the execution of a lighting program, the lighting units 40 will go through a number of different states, in that the changing of an effect, or parameter therefore, for any of the lighting units will result in a different state for the lighting units taken as a whole. When a lighting program is authored, a playback rate can be established, and the program can be stored in the storage medium with a frame corresponding to each update period established by the playback rate. A frame has sufficient information to establish a full state of the lighting units 40 controlled by the program. Thus, in accordance with one embodiment of the present invention, the storage medium stores the lighting program in a format so that there is a frame corresponding to each of the states of the lighting units. This is to be contrasted with other types of lighting unit playback devices, which do not store such complete frames, but rather, store information that enables the playback device to interpolate and thereby generate the frames necessary to place the lighting units in each of the plurality of states to be achieved. The embodiment of the present invention that stores a specific frame for each of the plurality of states is advantageous, in that it provides more flexibility in programming the lighting program. However, it should be appreciated that other embodiments of the present invention are not limited in this respect, and they can transfer data to and store it within the storage medium in different formats.

In one embodiment, the playback device 31 may include an external interface 650 whereby the playback device 31 can receive external signals useful for impacting (e.g., modifying) the execution or output of one or more stored lighting sequences 20. For example, the external interface 650 may include a user interface, which may in turn include switches, buttons, dials, sliders, a console, a keyboard, a speech recognition system, or any other device, such as a sensor, whereby a command or signal can be provided to the playback device 31 to otherwise influence the execution or output of the lighting sequence 20. The external devices may be coupled to the playback device 31 via any suitable technique, including a direct wire connection or via RF or some other type of wireless connection. The manner in which an external command or signal can influence execution or output of the lighting sequence 20 can be accomplished in any of numerous ways, as the present invention is not limited to any particular implementation. In the illustrative embodiment shown in FIG. 6, the playback device 31 is provided with a processor 651 that receives the output of the storage device 620, and can act thereon to influence the played back output of the lighting sequence 20 stored within the storage device 620. In the embodiment shown, the external interface 650 is directly coupled to the processor 651, such that the processor can examine any external signals and commands and make decisions based thereon to influence the played back output of the lighting sequence 20. As mentioned elsewhere herein, there are numerous types of external commands, cues and signals that can be provided and also numerous ways in which they can influence the execution of a lighting sequence, such that the present invention is not limited to any particular commands, cues or signals, nor any particular manner of influencing the playback of a lighting sequence.

In addition to influencing the played back output of a lighting sequence 20, an external command, cue or signal can also influence the execution order of a lighting sequence, by causing an alteration in the execution order of a lighting sequence, for example, by branching to places out-of-line in a particular lighting sequence or by branching out of the lighting sequence altogether. Thus, as shown in FIG. 6, commands, cues or signals received by the external interface 650 can be provided directly to the processor 651, which can then alter the playback sequence of a particular lighting sequence, go to the execution of stock effects, switch between lighting sequences, or take any other type of action relating to the execution order of lighting sequences from the storage device 620.

In the embodiment shown in FIG. 6, the playback device 31 further includes chronometers to provide timing references to the processor 651. In the embodiment shown, two such chronometers are employed, a first being a local time module 660, which functions as a counter for measuring time from a predetermined starting point, for example, when the playback device 31 is turned on or a point in time when the counter is reset. In addition, a date time module 665 is provided which calculates the current date and time. In the embodiment shown, an output from each of the modules 660, 665 is provided to the processor 651, which enables the processor 651 to include timing based information in making decisions impacting any of numerous aspects discussed above relating to the playback output and order of lighting sequences from the storage device 620, including but not limited to the rate at which a lighting sequence is being played back, the intensity or any other parameter relating to a lighting sequence being played back, switching between lighting sequences based upon a particular timing event, etc.

In the embodiment shown in FIG. 6, each of the timing modules 660, 665 can receive communications from an external source, for example, to reset the timing modules, to load a value therein, etc. It should be appreciated that a dedicated input port for the timing modules 660, 665 need not be employed, as they can alternatively receive communications from external sources via other paths, e.g., from the external interface 650, from the loader 610, from an output of the processor 651, etc., as the embodiment of the present invention that employs such timing modules is not limited to any particular implementation. In addition, while the timing modules, 660, 665 provide the advantages described above, it should be appreciated that they are optional, as some embodiments of the present invention need not employ any timing modules at all.

As discussed above, in one embodiment of the present invention, external signals received, via external interface 650, can be provided directly to the processor 651, which can then take any of the various actions described above based on the external signals, e.g., altering the rate at which lighting sequences are played back, branching within or between lighting sequences, altering brightness or other parameters of lighting sequences being played back, etc. In the embodiment of the invention shown in FIG. 6, a cue table 630 is also provided to compare or interpret external signals received via the external interface 650, and to provide information related thereto to the processor 651. The cue table 630 may contain information relating to various inputs or conditions received by the external interface 650, as designated by the author of a lighting sequence 620, to effect the execution or output of the lighting sequence. The cue table can include a list of if/then statements, other types of boolean expressions, or any other types of functions to interpret actions to be taken during execution of the lighting program based upon the information received from various inputs or conditions. Thus, if the playback device 31 compares an input to the cue table 630 and determines that a condition has been satisfied or a designated signal has been received, the playback device 31 may alter the execution or output of the lighting sequence 20 as indicated by the program, based upon information that is stored within the cue table 630 and provided to the processor 651. In the embodiment shown in FIG. 6, the signals received by the external interface 650 can be provided either directly to the processor 651 or can be interpreted via the cue table 630. It should be appreciated that other configurations are possible, as the present invention is not limited to the particular implementation shown in FIG. 6. For example, the signals received by the external interface 650 can, in another embodiment of the invention, not be sourced directly to the processor 651, such that they can always be interpreted via the cue table 630. Alternatively, in another embodiment of the invention, the cue table 630 can be eliminated.

In certain embodiments, the playback device 31 may respond to external signals in ways that are not determined by the contents and instructions of the lighting sequence 20. For example, the external interface 650 may include a dial, slider, or other feature by which a user may alter the rate of progression of the lighting sequence 20, e.g., by changing the speed of the local time counter 660, or by altering the interpretation of this counter by the playback device 31. Similarly, the external interface 650 may include a feature by which a user may adjust the intensity, color, or other characteristic of the output. In certain embodiments, a lighting sequence 20 may include instructions to receive a parameter for an effect from a feature or other user interface on the external interface 650, permitting user control over only specific effects during playback, rather than over all of the effects output to the system of lighting units as a whole.

It should be appreciated that the specific types of external interfaces described above, as well as their specific impacts on a lighting sequence, are provided merely for illustrative purposes, as numerous other types of interfaces and impacts on a lighting sequence are possible. Thus, the embodiment of the present invention related to the use of an external interface to impact the playing back of the lighting sequence is not limited to the specific examples described above. Furthermore, although this embodiment of the present invention includes a number of advantages as described above, it should be appreciated that an external interface is not a requirement of other aspects of the present invention, as various embodiments of the present invention need not employ an external interface at all.

The playback device 31 may also include a transient memory 640. The transient memory 640 may store temporary information, such as the current state of each lighting unit under its control, which may be useful as a reference for the execution of the lighting sequence 20. For example, as described above, some effects may use the output of another effect to define a parameter; such effects may retrieve the output of the other effect as it is stored in the transient memory 640. It should be appreciated that the embodiment of the present invention that employs a transient memory is not limited to using it in this manner, as numerous other uses may be possible (e.g., as a scratch pad memory for the processor 651). Furthermore, various embodiments of the present invention can be implemented without using any transient memory at all.

The playback device 31 may send the data created by the execution of a lighting sequence 20 to the lighting units 40 in any of numerous ways, as the present invention is not limited to any particular technique. In the embodiment shown in FIG. 6, the playback device 31 transmits such data to the lighting units 40 via a network output port 680, which can be any of numerous types of interfaces capable of communicating with the lighting units 40. For example, the network output 680 can be an interface for connection to the lighting units via wires or cables, via an IR, RF or other wireless transmission, over a computer network, any other suitable method of data transfer, or via any combination of techniques capable of controlling the lighting units 40 and/or any associated other devices. In the embodiments shown, the information read from the storage device 620 is passed through an output buffer 670 that is then coupled to the network output port 680. However, it should be appreciated that the present invention is not limited in this respect, as no output buffer need be used in other embodiments.

In one embodiment of the present invention, the storage device 620 can be loaded with only a single lighting sequence 20 at any particular time, such that the playback device 31 is programmed to only play one particular lighting sequence 20. In accordance with this embodiment of the present invention, execution of the single lighting sequence 20 can begin immediately upon the playback device 31 receiving power, and the lighting sequence 20 can be programmed to execute a set number of times (e.g., once or multiple times), or it can be programmed to continuously loop through multiple executions.

In an alternate embodiment of the present invention, the playback device 31 is arranged to enable multiple lighting sequences 20 to be stored within the storage device 620. In accordance with this embodiment of the present invention, some user interface is provided to enable a user to select which of the multiple lighting sequences 20 is to be played back at any particular time. The present invention is not limited to the use of any particular type of user interface in this regard, as numerous techniques can be employed. In one embodiment of the present invention, it is desirable to minimize the size, cost and complexity of the playback device 31. In accordance with that embodiment of the present invention, a simple button or switch can be employed that, when toggled, switches between the multiple lighting sequences 20 stored within the storage device 620.

In the embodiment shown in FIG. 6, separate data paths are shown for providing input to the timing modules 660, 665, the loader 610, the external interface 650 and the network output port 680. It should be appreciated that numerous other implementations are possible that can reduce the number of input/output ports on the playback device 31. For example, a single data path can be shared for providing data to the timing modules 660, 665 and the loader 610. In addition, a bi-directional input/output interface can be used so that the data path for loading the storage device 620 can be shared with the data path for providing an output to the plurality of lighting units. In addition, to reduce the number of input/output ports on the device, serial (rather than parallel) interfaces can be employed. Thus, as should be appreciated from the foregoing, numerous techniques are possible for configuring the input/output ports of the playback device 31, as the present invention is not limited to any particular implementation technique.

In certain embodiments, the playback device 31 may not communicate directly with the lighting units, but may instead communicate with one or more subcontrollers which, in turn, control the lighting units or another level of subcontrollers, etc. The use of subcontrollers permits distributive allocation of computational requirements. An example of such a system which uses this sort of distributional scheme is disclosed in U.S. Pat. No. 5,769,527 to Taylor, described therein as a "master/slave" control system. Communication between the various levels may be unidirectional, wherein the playback device 31 provides instructions or subroutines to be executed by the subcontrollers, or bidirectional, where subcontrollers relay information back to the controller 30, for example, to provide information useful for effects which rely on the output of other effects as described above, for synchronization, or for other purposes.

As discussed above, the playback device 31 architecture permits effects to be based on external environmental conditions or other input. An effect is a predetermined output involving one or more lighting units. For example, fixed color, color wash, and rainbow wash are all types of effects. An effect may be further defined by one or more parameters, which specify, for example, lights to control, colors to use, speed of the effect, or other aspects of an effect. The environment refers to any external information that may be used as an input to modify or control an effect or the playback of one or more lighting sequences, such as the current time or external inputs such as switches, buttons, or other transducers capable of generating control signals, or events generated by other software or effects. Finally, an effect may contain one or more states, so that the effect can retain information over the course of time. A combination of the state, the environment, and the parameters may be used to fully define the output of an effect at any moment in time, and over the passage of time.

In addition, the playback device 31 may implement effect priorities. For example, different effects may be assigned to the same lights. By utilizing a priority scheme, differing weights can be assigned to effects assigned to the same lights. For example, in one embodiment only the highest priority effect will determine the light output. When multiple effects control a light at the same priority, the final output may be an average or other combination of the effect outputs.

Figure 7:
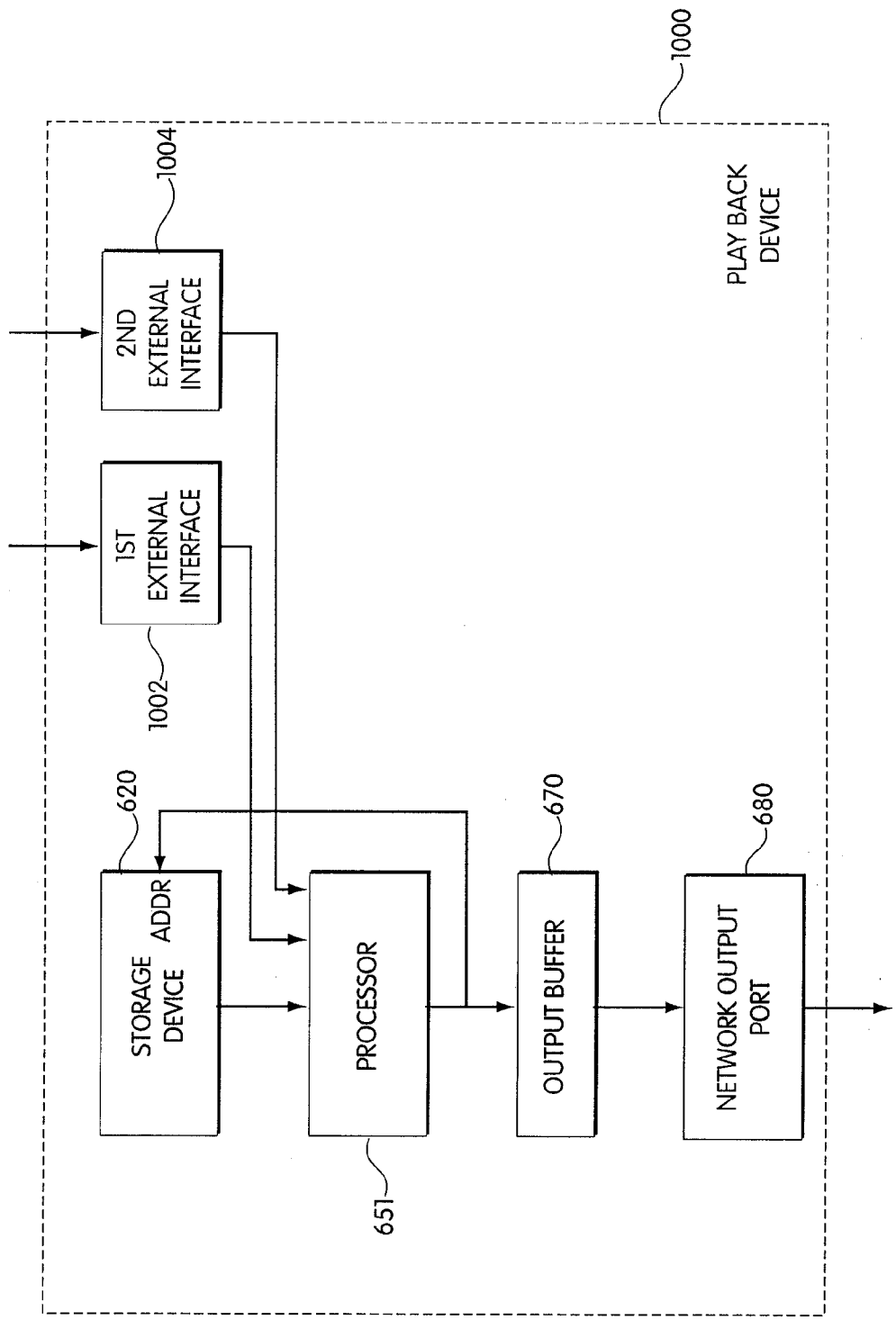
FIG. 7 shows a block diagram of an alternate embodiment of the present invention directed to an apparatus for executing a lighting sequence.

An alternate embodiment of the present invention is directed to a playback device 1000, as shown in FIG. 7, that differs from the playback device 31 described above in that it does not include a loader 610 for loading lighting programs into the storage device 620. In accordance with this illustrative embodiment of the present invention, the playback device 1000 is not loadable with customized lighting programs via the user, but rather can be provided with a storage device 620 having one or more pre-installed lighting programs already loaded thereon, such that the lighting programs stored in the playback device 1000 are not modifiable by the user.

In the embodiment shown in FIG. 7, the playback device 1000 does not include a cue table 630, timing modules 665 or 660, or a transient memory 640. However, it should be appreciated that any or all of these features can alternatively be provided, in much the same manner as described above in connection with the playback device 31 of FIG. 6.

In one embodiment of the playback device 1000, the storage device 620 stores multiple lighting programs, in much the same manner as discussed above in connection with some embodiments of the playback device 31 in FIG. 6. In accordance with this embodiment, a first external interface 1002 is provided to receive an externally generated signal to select which lighting program stored within the storage device 620 is to be played back by the playback device 1000. The first external interface 1002 is compatible with any of numerous types of user interfaces to enable selection of a particular lighting program to be played back. For example, in accordance with one illustrative embodiment of the present invention, a push button, toggle switch or other type of device can be used that when activated by the user, causes the processor 651 to select a next lighting program for playback, so that by repeatedly toggling the input device, a user can step through all of the lighting programs stored in the storage device 620 to select a desired program for execution.

In the embodiment shown in FIG. 7, the playback device 1000 further includes a second external interface 1004 that is compatible with another user interface to enable the user to vary a parameter of a lighting program being played back by the playback device 1000. The parameter being varied can apply to all of the lighting effects in a lighting program (e.g., can influence the playback speed or intensity of an entire lighting program being played back) or can relate to only a subset (including only a single effect) of the lighting effects. Any of numerous types of lighting effect or parameter changes can be accomplished, as described above in connection with other embodiments of the present invention. Similarly, the user interface compatible with the second external interface 1004 can take any of numerous forms, as this embodiment of the present invention is not limited to the use of any particular type of interface. For example, in one embodiment of the present invention the user interface may be capable of generating a plurality of different signals, which can be used to vary a parameter of the lighting program being played back, such as the playback speed, intensity of illumination, color of a particular portion of a lighting program (including adjustments in hue, saturation and/or intensity) or any other parameter. For example, the second external interface may provide a variable digital signal to the processor 651 depending on the setting or position of the user interface. Alternatively, the user interface may supply an analog signal to the second external interface 1004, which can then convert the analog signal to a digital signal for communication to the processor 651.

While the embodiment of the present invention shown in FIG. 7 includes separate first and second external interfaces to perform the functions of selecting a particular lighting program to be played back and varying a lighting effect or parameter thereof, it should be appreciated that the present invention is not limited in this respect, and that other arrangements are possible, such as employing a single user interface to perform both of these functions.

As indicated above, in an alternate embodiment of the present invention, a cue table 630 can be provided to interpret the information received from the first and second external interfaces 1002, 1004, rather than providing their outputs directly to the processor 651.

A lighting sequence as described above may be implemented using one or more subroutines, such as a Java program fragment. Such subroutines may be compiled in an intermediate format, such as by using an available Java compiler to compile the program as byte codes. In such a byte code format, the fragment may be called a sequence. A sequence may be interpreted or executed by the playback device 31. The sequence is not a stand-alone program, and adheres to a defined format, such as an instantiation of an object from a class, that the playback device 31 may use to generate effects. When downloaded into the playback device 31 (via serial port, infrared port, smart card, or some other interface), the playback device 31 interprets the sequence, executing portions based on time or input stimuli.

In one embodiment, a building block for producing a show is an effect object. The effect object includes instructions for producing one specific effect, such as color wash, cross fade, or fixed color, based on initial parameters (such as which lights to control, start color, wash period, etc.) and inputs (such as time, environmental conditions, or results from other effect objects). The sequence contains all of the information to generate every effect object for the show. The playback device 31 instantiates all of the effect objects one time when the show is started, then periodically sequentially activates each one. Based on the state of the entire system, each effect object can programmatically decide if and how to change the lights it is controlling.

The run-time environment software running on the playback device 31 may be referred to as a conductor. The conductor may be responsible for downloading sequences, building and maintaining a list of effect object instances, managing the interface to external inputs and outputs (including DMX), managing the time clock, and periodically invoking each effect object. The conductor also maintains a memory (e.g., transient memory 640) that objects can use to communicate with each other.

A channel may be a single data byte at a particular location in the DMX universe. A frame may be all of the channels in the universe. The number of channels in the universe is specified when the class is instantiated.

When an effect object sets the data for a particular channel it may also assign that data a priority. The priorities can be interpreted in any of numerous ways. For example, if the priority is greater than the priority of the last data set for that channel, then the new data may supercede the old data; if the priority is lesser, then the old value may be retained; and if the priorities are equal, then the new data value may be added to a running total and a counter for that channel may be incremented. When the frame is sent, the sum of the data values for each channel may be divided by the channel counter to produce an average value for the highest priority data. Of course, other ways of responding to established priorities are possible.

After each frame has been sent the channel priorities may all be reset to zero. The to-be-sent data may be retained, so if no new data is written for a given channel it will maintain its last value, and also copied to a buffer in case any effect objects are interested.

The conductor is the run-time component of the playback device 31 that unites the various data and input elements. The conductor may download sequences, manage the user interface, manage the time clock and other external inputs, and sequence through the active effect objects.

The technique for downloading the sequence file into the conductor can vary depending on the hardware and transport mechanism. In one embodiment, the sequence object and various required classes may be loaded into memory, along with a reference to the sequence object.

In one embodiment, more than one sequence object may be loaded into the conductor, and only one sequence may be active. The conductor can activate a sequence based on external inputs, such as the user interface or the time of day.

The above-discussed embodiments of the playback device 31 can be implemented in any of numerous ways. Thus, while a single processor 651 is shown in the embodiment of FIG. 6 to perform each of the functions described above, it should be appreciated that the present invention is not limited in this respect, and that the various functions described above as being performed by the processor 651 can be distributed among two or more processors or controllers, such that in one embodiment there is a dedicated controller to carry out each of the functions of the processor 651 described above.

Controlling Lighting Systems in Response to an Audio Input

Figure 8:
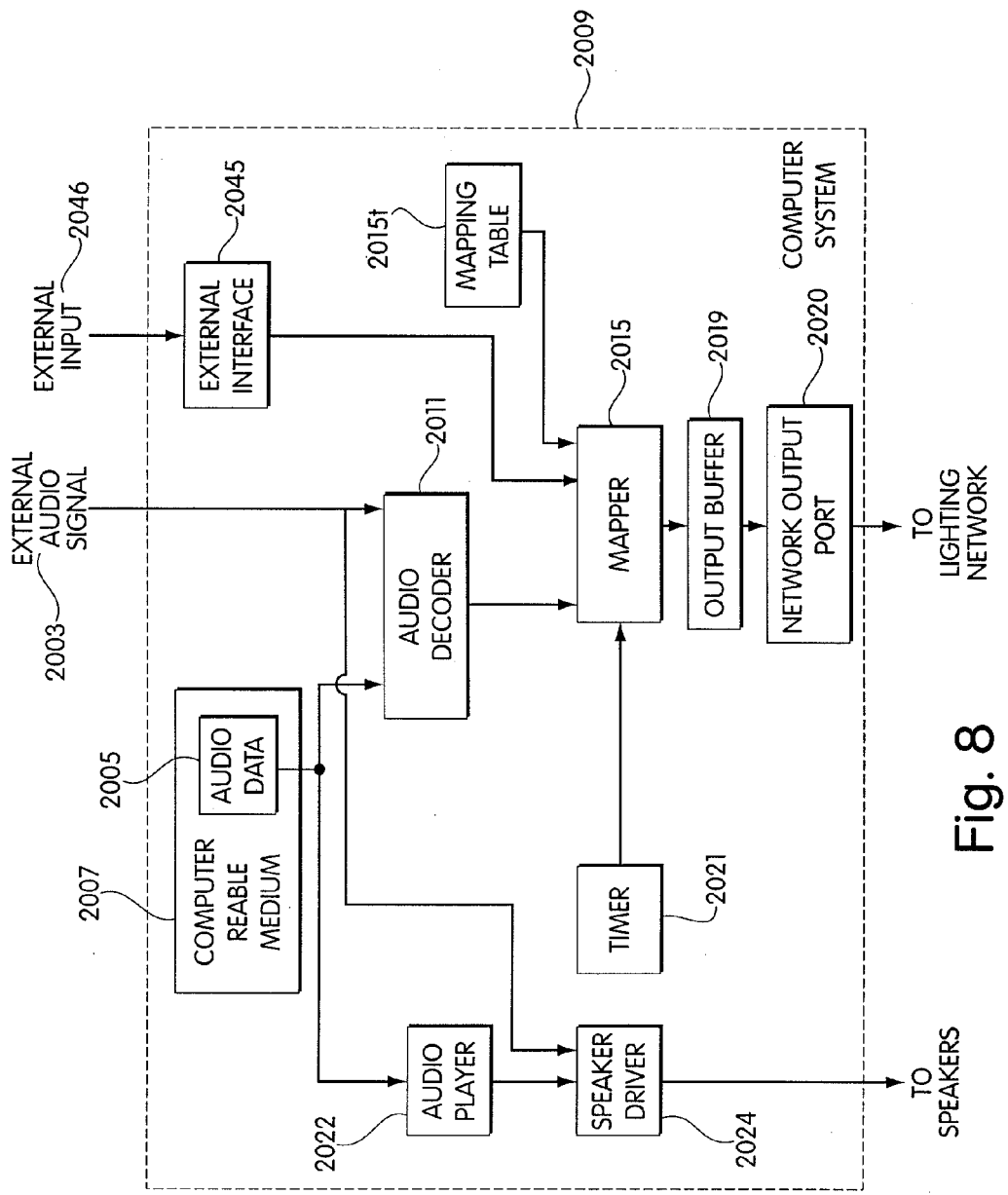
FIG. 8 is a diagram showing an apparatus for controlling a lighting network in response to an audio input according to another embodiment of the invention.

As mentioned above, one embodiment of the present invention is directed to a method and apparatus for controlling a lighting system in response to an audio input. FIG. 8 illustrates a computer system 2009 for implementing this embodiment of the present invention. However, it should be appreciated that this embodiment of the present invention is not limited to the implementation shown in FIG. 8, as numerous other implementations are possible.

The audio input can be provided in any of numerous ways. In the embodiment shown in FIG. 8, the audio input is provided as audio data 2005 provided on a computer-readable medium 2007 accessible to the computer system 2009. The computer-readable medium 2007 can take any of numerous forms, as the present invention is not limited to the use of any particular computer-readable medium. Examples of suitable computer-readable media include compact discs, floppy discs, hard discs, magnetic tapes, and volatile and non-volatile memory devices.

The audio data 2005 may be stored in any format suitable for the storage of digital data. One popular format is the MPEG Layer III data compression algorithm, which is often used for transmitting files over the Internet, and is widely known as MP3. The files stored in the MP3 format are typically processed by an MP3 decoder for playback. It should be appreciated that MP3 is merely one of numerous types of formats suitable for the storage of digital data, with other examples including MIDI, MOD, CDA, WMA, AS and WAV. It should be appreciated that these are merely examples of suitable formats, and that there are other standards and formats that can be used, including formats that do not adhere to any particular standard. In addition, while the MP3 format compresses the data, it should be appreciated that other formats may not. It should further be appreciated that the present invention is not limited to use with data stored in any particular format.

Rather than originating from a computer readable medium accessible to the computer system 2009, such as a microphone, stereo system, musical instrument or any other source capable of generating an audio signal 2003. The audio signal 2003 may be a digital signal, input to the computer system 2009 via a digital interface such as a USB, serial or parallel port or any other suitable interface, or may be an analog signal, input to the computer system 2009 via an audio jack or any other suitable interface. In accordance with one embodiment of the present invention, when the audio signal 2003 is provided in analog form, it can be converted (via an analog-to-digital converter not shown) within the computer system 2009, so that the audio signal can be processed digitally, which provides a number of advantages as discussed below. However, it should be appreciated that not all aspects of the present invention are limited in this respect, such that other embodiments of the present invention can process the audio signal in analog form.

In the embodiment shown in FIG. 8, the computer 2009 includes an audio decoder 2011 that accepts as an input either audio data 2005 which is stored on a computer readable medium 2007 coupled to the computer 2009, or an external audio signal 2003. The audio decoder 2011 generates as an output information reflective of one or more characteristics of the audio signal that is input to the audio decoder (i.e., either the audio signal defined by the audio data 2005 or the external audio signal 2003). The information characteristic of the audio input signal can take any of numerous forms, as the present invention is not limited to any particular technique for analyzing an audio signal. In accordance with one embodiment of the present invention, digital signal processing techniques are used to analyze the audio signal. It should be appreciated that there are many different types of computations that can be performed using digital signal processing techniques, and the present invention is not limited to any particular technique for analyzing the audio signal. Examples of information characteristic of an audio signal include information relating to a frequency content and an intensity of the audio signal. For example, the audio decoder 2011 may generate time domain information for the audio input signal, representing the intensity of the audio signal over time. The time domain information may be outputted as an array, wherein each array element is an integer representing the intensity of the audio signal for a given point in time, or in any other suitable format. Audio decoder 2011 may further generate frequency domain information by performing a Laplace transform (examples of which include a Fourier transform and a fast Fourier transform (FFT)) of time domain information for the audio signal. In one embodiment, a fast Fourier transform is performed, but the present invention is not limited in this respect and can employ any suitable technique for analysis in the frequency domain. The frequency domain information may be outputted as an array, wherein each array element is an integer representing the intensity of the audio signal for a given point in time. Audio decoder 2011 may further generate frequency domain information by performing a fast Fourier transform (FFT) of time domain information for the audio signal. The frequency domain information may be outputted as an array, wherein each array element can be an integer representing the amplitude of the signal for a given frequency band during a corresponding time frame. In accordance with one embodiment of the present invention, the frequency domain information is the FFT of the corresponding time domain information for a particular time frame. Again, it should be appreciated that the audio decoder 2011 is not limited to generating information characteristic of an audio signal in this manner, as other techniques for analyzing an audio signal and formats for presenting information relating thereto are possible.

It should be appreciated that many audio signal formats comprise two or more independently encoded channels, and that many audio file formats maintain the independence of the channel data. Examples of such multi-channel audio signals include stereo signals, AC-1 (Audio Coding-1), AC-2 and AC-3 (Dolby Digital). In accordance with one embodiment of the present invention, each channel for a single audio signal is analyzed separately by the audio decoder 2011, such that separate information is generated by analyzing the characteristics of the different channels. For example, using the example described above, wherein the information concerning an audio signal includes frequency domain information and time domain information, in one embodiment of the present invention the audio decoder 2011 generates separate frequency domain information and time domain information for each separate channel for a single input audio signal (e.g., audio data 2005 or external audio signal 2003).

The audio decoder 2011 can be implemented in any of numerous ways, as the present invention is not limited to any particular implementation technique. For example, the audio decoder 2011 can be implemented in dedicated hardware, or can be implemented in software executed on a processor (not shown) within the computer system 2009. When implemented in software, the audio decoder 2011 can be provided as an executable program written in any suitable computer programming language (e.g., Fortran, C, Java, C++, etc.). The software for implementing the audio decoder 2011 can be stored on any computer readable medium accessible to the computer system 2009, including the computer readable medium 2007 that stores the audio data 2005, or any other computer readable media. The software for implementing the audio decoder 2011 can, for example, can be any one of a number of commercially available software programs that perform the above-described functions. Examples of such commercially available software programs include MP3 players such as Winamp™, available from Nullsoft, Inc. Such commercially available MP3 players include application programming interfaces (APIs) that enable third party add-on plug-in software components to interface with the MP3 player, and to take advantage of the functionality provided thereby, including the above-described information that the audio decoder 2011 provides concerning the characteristics of an audio input. Thus, as discussed further below, one embodiment of the present invention is directed to software, for execution on a computer system 2009, that acts as a plug-in to a commercially available MP3 player to provide the mapping functions described below to control a lighting network in response to an input audio signal (e.g., stored audio data 2005 or an external audio signal 2003).

The mapper 2015 performs a function that is similar in many respects to the playback function performed by the processor 651 and the storage device 620 (see e.g., FIGS. 6-7) in the embodiments discussed above. In this respect, the mapper 2015 can be provided with a lighting program (e.g., stored in a mapping table 2015*t*) that can include one or more variables to receive input values at execution time. As shown in FIG. 8, the mapper 2015 can receive the output of the audio decoder 2011, so that information concerning the characteristics of the input audio signal can be provided to the mapper 2015 to provide the input values for variables in the lighting program executed by the mapper 2015.

In accordance with one illustrative embodiment of the present invention, the mapper 2015 can execute lighting programs that each includes only a single entry defining the manner in which control signals, to be passed to the lighting network, will be generated. Each such lighting program for the mapper 2015 may be programmed using a number of if/then statements or Boolean logic to interpret the numerous varied permutations of inputs from the audio decoder 2011 relating to characteristics of the audio input signal, and may generate control signals to the lighting network accordingly. Even with such static lighting programs, the control signals transmitted to the lighting network will result in a changing light show as the input audio signal is played, as the characteristics of the audio signal will change over time, resulting in changing inputs to the mapper 2015 and, consequently, changing control signals sent to the lighting network. Alternatively, the mapping table 2015*t* can include lighting programs that include a plurality of lighting sequences, in much the same manner as the embodiments described above (e.g., in connection with FIGS. 6-7). In accordance with these embodiments of the present invention, the mapper 2015 will step through various lighting sequences as the input audio signal is played back, which can result in a more varied light show, as not only will the inputs from the audio decoder 2011 change as the input audio signal is played back, but the mapping function executed by the mapper 2015 can also be programmed to change over time.

It should be appreciated that the embodiment of the present invention shown in FIG. 8 can be programmed (i.e., in the mapping table 2015*t*) with lighting programs that can achieve any of the lighting effects discussed above, including those described in connection with the systems in FIGS. 1-7.

In the embodiment shown in FIG. 8, the computer system 2009 includes a timer 2021 that provides an input to the mapper 2015. The timer can be used in a manner similar to the timing modules 660, 665 discussed above in connection with the embodiment of FIG. 6, but is an optional feature that need not be employed in all embodiments of the present invention. In accordance with one embodiment of the present invention, the timer 2021 is used to provide variation over time in the mapping function executed by the mapper 2015, to achieve resulting variation in the control signals sent to the lighting network during the playback of one or more audio input signals and thereby avoid redundancy in the lighting show produced in response to the audio signals. This changing of the mapping function can be accomplished in any of numerous ways. For example, for a particular entry in the mapping table 2015*t*, a variable can be provided that receives an input value from the timer 2021, such that the timer information can be taken into account in the mapping logic. Alternatively, a mapper 2015 can use inputs received from the timer 2021 to index into the mapping table 2015*t* to select a different lighting program, or a different line within a particular lighting program, to change the mapping function. As with the embodiment of the present invention discussed above in connection with FIGS. 6-7, the timer 2021 can include date and time information, such that the mapping function can change as a result of the date and/or time, or can include local time information so that the mapping function can be changed as a result of the amount of time that a particular lighting show has been executed in response to audio signal inputs.

In the embodiment of FIG. 8, an external interface 2045 is provided to receive additional user inputs that can be input to the mapper 2015 to impact the control signals sent to the lighting network. It should be appreciated that this is an optional feature, and need not be provided in every embodiment of the present invention. The external interface 2045 can be of any of numerous types, including all of those discussed above in connection with the embodiments of FIGS. 1-7, and can control the lighting show produced by the mapper 2015 in any of the numerous ways discussed above. For example, one or more additional external inputs can provide an additional variable to the mapping function performed by the mapper 2015 to impact the control signals sent to the lighting network. In addition, the external input received by the external interface 2045 can also be used to change between lighting programs provided by the mapping table 2015*t*, change the sequence of commands executed thereby (e.g., by branching to an out-of-line location), or any of the other results described in connection with the embodiments discussed above.

In accordance with one illustrative embodiment of the present invention, the external interface 2045 is a graphical user interface (GUI) that can be displayed on a display of the computer system 2009 to facilitate a user in selecting a particular mapping function to be provided by the mapping table 2015*t*. This aspect of the present invention can be implemented in any of numerous ways, and is not limited to any particular implementation technique. As an example, a graphical user interface can be provided that lists various types of mapping functions that are considered to be particularly suitable for particular music types. Thus, prior to playing a particular song as the audio input signal, a user can select a mapping function (e.g., from the mapping table 2015*t*) that fits the style of music of the song to be played. In this manner, the user can customize the lighting show generated based upon the type of music to be played. Of course, it should be appreciated that this is simply one example of the manner in which a graphical user interface can be used, as numerous other implementations are possible.

In another embodiment of the present invention, the particular mapping function employed can be selected based upon information provided with the audio signal that provides an indication of the type of music included therein. Specifically, some pieces of music can include a tag or other information in the music, or associated therewith, that identifies the type of music. In accordance with one embodiment of the present invention, such information can be used to select a mapping function that fits the style of music in much the same manner as described above.

As should be appreciated from the foregoing, changes in the mapping performed by the mapper 2015 can be accomplished in numerous ways by including a variable in a single mapping function that can result in changes of the mapping output or by switching between different mapping functions in the mapping table 2015*t*. The changes in the mapping performed by the mapper 2015 can be accomplished in response to any of numerous stimuli, including input provided from an external input (e.g., from a user selecting a different mapping function), in response to timing information from the timer 2021, in response to some characteristic of an input audio signal (e.g., provided to the mapper 2015 by the audio decoder 2011), in response to a detection by the audio decoder that a particular audio signal (e.g., a song) has terminated and a new one is beginning, etc. Thus, there are numerous ways of continually updating the mapping performed by the mapper 2015. Of course, it should be appreciated that the present invention is not limited to using any or all of these techniques, as these are described herein merely for illustrative purposes.

In the embodiment shown in FIG. 8, the computer system 2009 does not include a cue table 630 or a transient memory 640 as described in connection with the embodiment of FIG. 6. However, it should be appreciated that either or both of these features can alternatively be provided, in much the same manner as described above in connection with the playback device 31 of FIG. 6. In this respect, the cue table 630 can be provided between the external interface 2045 and the mapper 2015, and/or between the audio decoder 2011 and the mapper 2015 to assist in analyzing the inputs provided by the external interface 2045 and/or the characteristics of the input audio signal provided by the audio decoder 2011. Of course, it should be appreciated that these features are optional, and need not be employed in all embodiments of the present invention.

As mentioned above, it should be appreciated that the manner in which the characteristics of the input audio signal are analyzed by the mapper 2015 to impact the control signals sent to the lighting network to control the lighting show can be performed in any of numerous ways, as the present invention is not limited to any particular type of analysis. For example, the mapper 2015 can look for particular activity levels within a particular frequency band, can detect a beat of the music based upon pulses within particular frequency bands or overall activity of the input signal, can look for an interaction between two or more different frequency bands, can analyze intensity levels characteristic of a volume at which the audio signal is being played, etc. One variable for consideration by the mapper 2015 is the sensitivity of the system at which differences in a characteristic of the audio signal will be recognized, resulting in a change in the control signals sent to the lighting network, and thereby a change in the lighting show. As indicated above, in one embodiment of the present invention, the external interface 2045 can also enable external inputs (e.g., inputs from a user) to change any of numerous variables within the mapping function to impact the lighting show produced.

It should be appreciated that the mapper 2015 can be implemented in any of numerous ways, including with dedicated hardware, or with software executed on a processor (not shown) within the computer system 2009. When implemented in software, the software can be stored on any computer readable medium accessible to the computer system 2009, including a computer readable medium 2007 that stores the audio data 2005. The software that implements the mapper 2015 can be implemented as an executable program written in any number of computer programming languages, such as those discussed above. The software can be implemented on a same processor that also executes software to implement the audio decoder 2011, or the computer system 2009 can be provided with separate processors to perform these functions.

As discussed above, one embodiment of the present invention is directed to the provision of a software plug-in that is compatible with commercially available MP3 players to enable the control of a lighting network in response to an audio signal being played by the MP3 player. Thus, one embodiment of the present invention is directed to a computer readable medium encoded with a program that, when executed by a processor on a computer system such as 2009, interacts with an audio decoder 2011 of an MP3 player executing on the computer system 2009, and implements the functions of the mapper 2015 to generate the control signals necessary to control a lighting network as described above. Of course, it should be understood that this is simply one illustrative embodiment of the present invention, as numerous other implementations are possible.

As with the other embodiments of the invention described above, the lighting units 40 (FIG. 1) of the lighting network may be any type of light source, including incandescent, LED, fluorescent, halogen, laser, etc. Each lighting unit may be associated with a predetermined assigned address as discussed above. The computer system 2009 may send control signals to the lighting network in any of numerous ways, as the present invention is not limited to any particular technique. In the embodiment shown in FIG. 8, the computer system 2009 includes an output buffer 2019 and a network output port 2020 to facilitate transmission of control signals from the mapper 2015 to the lighting network. The network output port 2020 can be any of numerous types of interfaces capable of communicating with the lighting network, including the numerous types of interfaces discussed above in connection with the output ports 680 described in connection with FIGS. 6-7. In the embodiments shown, the information outputted by the mapper 2015 is passed through an output buffer 2019 that is then coupled to the network output 2020. However, it should be appreciated that the present invention is not limited in this respect, as no output buffer need be used.

It should be appreciated that the information stored in the mapping table 2015t and output from the mapper 2015 may not be in a format capable of directly controlling a lighting network, such that in one embodiment of the present invention, a format conversion is performed. As discussed above, examples of formats for controlling a plurality of lighting units include data streams and data formats such as DMX, RS-485, RS-232, etc. Any format conversion can be performed by the mapper 2015, or a separate converter can be employed. The converter can be implemented in any of numerous ways, including in dedicated hardware or in software executing on a processor within the computer system 2009.

In the embodiment of the invention shown in FIG. 8, the computer system 2009 not only generates control signals to control a lighting network, but also drives one or more speakers to generate an audible sound from the audio input signal, with the audible sound being synchronized to the light show produced by the lighting network. For example, the computer system 2009 includes an audio player 2022 that reads audio data 2005 stored on the computer readable medium 2007, performs any processing necessary depending upon the format in which the audio data 2005 is stored (e.g., decompresses the data if stored in a compressed format) and passes the information to a speaker driver 2024 which can then drive one or more speakers to produce an audible sound. It should be appreciated that the one or more speakers described above may include any device for generating audible output including, for example, headphones and loudspeakers. The speaker driver 2024 can be implemented in any of numerous ways, as the present invention is not limited to any particular implementation technique. For example, the speaker drivers 2024 can be implemented on a sound card provided within the computer system 2009. The audio player 2022 also can be implemented in any of numerous ways. For example, commercially available MP3 players include software that, when executed on a processor within the computer system 2009, perform the functions of the audio player 2022.

It should be appreciated that the external audio signal 2003 can be provided in either digital form, or in analog form. When provided in analog form, the external audio signal may pass through an analog-digital converter (not shown) within the computer system 2009 prior to being passed to the audio decoder 2011. This conversion can be accomplished in any of numerous ways, as the present invention is not limited to any particular implementation. For example, the external audio signal can be provided to a sound card within the computer system 2009, which can perform the analog-to-digital conversion.

It should be appreciated that in the embodiment of the present invention wherein the same computer system 2009 that generates the control signals for the lighting network also drives speakers to generate an audible sound for the audio signal, some synchronization may be performed to ensure that the lighting show produced on the lighting network is synchronized with the audible playing of the audio signal. This can be accomplished within the computer system 2009 in any of numerous ways. For example, when the audio player 2022 and audio decoder 2011 are provided as part of a commercially available MP3 player, the MP3 player will automatically perform this synchronization.

As should be appreciated from the foregoing, in one embodiment of the present invention, the analyzing of an audio input signal is performed essentially simultaneously with a playing of the audio signal to generate an audible sound. However, the present invention is not limited in this respect, as in another embodiment of the present invention, the analysis of the audio input signal is performed prior to playing the audio signal to generate an audible sound. This can provide for some flexibility in performing the mapping of the audio input signal to control signals for the lighting network, as the mapping function can consider not only the characteristics of the audible signal that corresponds with the instant in time for the control signals being generated, but can also look ahead in the audio signal to anticipate changes that will occur, and thereby institute lighting effects in advance of a change in the audible playback of the audio signal. This can be performed in any of numerous ways. For example, the audio input signal can be analyzed prior to it being played to generate an audible output, and the results of that analysis (e.g., from the audio decoder 2011) can be stored in memory (e.g., in a transient memory such as 640 in FIG. 6) or in the mapping table 2015*t*, for future reference by the mapper 2015 when the audio signal is audibly played. Thus, the function performed by the mapper 2015 can look not only to characteristics of the music that correspond to the point in time with the audio signal being played, but can also look ahead (or alternatively behind) in the audio signal to anticipate changes therein. Alternatively, rather than storing the outputs that are characteristic of the audio signal, another option is to perform the mapping at the time when the audio input signal is first analyzed, and store the entire control signal sequence in memory (e.g., in the mapping table 2015*t*). Thereafter, when the audio signal is audibly played, the mapper 2015 need not do any analysis in real time, but rather, can simply read out the previously defined control signals, which for example can be stored at a particular sample rate to then be played back when the audio signal is played to generate an audible signal.

While the embodiment of the present invention directed to performing an analysis of the audio signal prior to playing it back provides the advantages described above, it should be appreciated that this is not a requirement of all embodiments of the present invention.

It should be appreciated that the lighting programs (e.g., entries in the mapping table 2015*t*) for the embodiment shown in FIG. 8 can be authored using an authoring system in much the same manner as described above in connection with the generation of lighting programs for the embodiments of FIGS. 1-7. Thus, for example, a graphical user interface can be provided to assist a user in generating the lighting programs. As with the embodiments of the invention described above, the authoring can be performed on the same computer system 2009 that is used to playback the lighting program and generate the control signals to the lighting network, or the lighting programs can be authored on a different system, and then transferred, via a computer readable medium, to the mapping table 2015*t* in the computer system 2009.

In accordance with an alternate embodiment of the invention, Applicants have appreciated that the device used to control the lighting network 2001 need not have all of the functionality and capability of a computer system, for example it need not include a video monitor, keyboard, or other robust user interface. Furthermore, Applicants have appreciated that in many instances, it is desirable to provide a relatively small and inexpensive device to perform the lighting control function in response to an audio input, so that the device can be portable.

Figure 9:
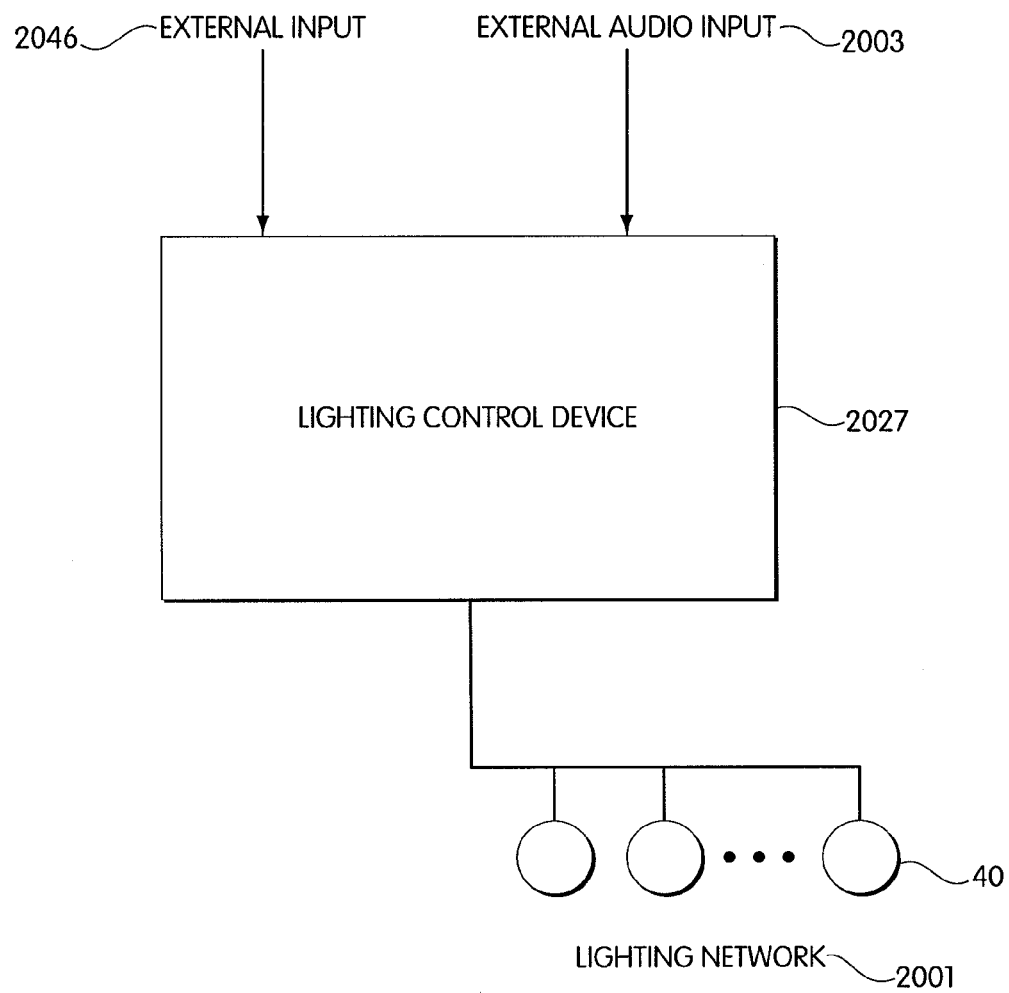
FIG. 9 is a diagram showing an apparatus for controlling a lighting network in response to an audio input according to another embodiment of the invention.

In view of the foregoing, one embodiment of the present invention, is directed to a lighting control device that includes all of the functionality described above in connection with FIG. 8, but is implemented on a computer system that is dedicated to performing the functions described above, and is not a general purpose computer. An illustration of this embodiment of the present invention is provided in FIG. 9, which discloses a lighting control device 2027 for controlling lighting units 40 of a lighting network 2001 in response to audio input data or an input audio signal. The lighting control device performs all of the functions of the embodiment illustrated in FIG. 8, but is not implemented on a general purpose computer. Rather, the lighting control device is a device dedicated to performing only those functions described above, and need not include a lot of the functionality found in a general purpose computer, such as a full size display, a full alphanumeric keyboard, an operating system that enables processing of multiple applications simultaneously, etc. The lighting control device can take any of numerous forms, as the present invention is not limited to any particular implementation.

Figure 10:
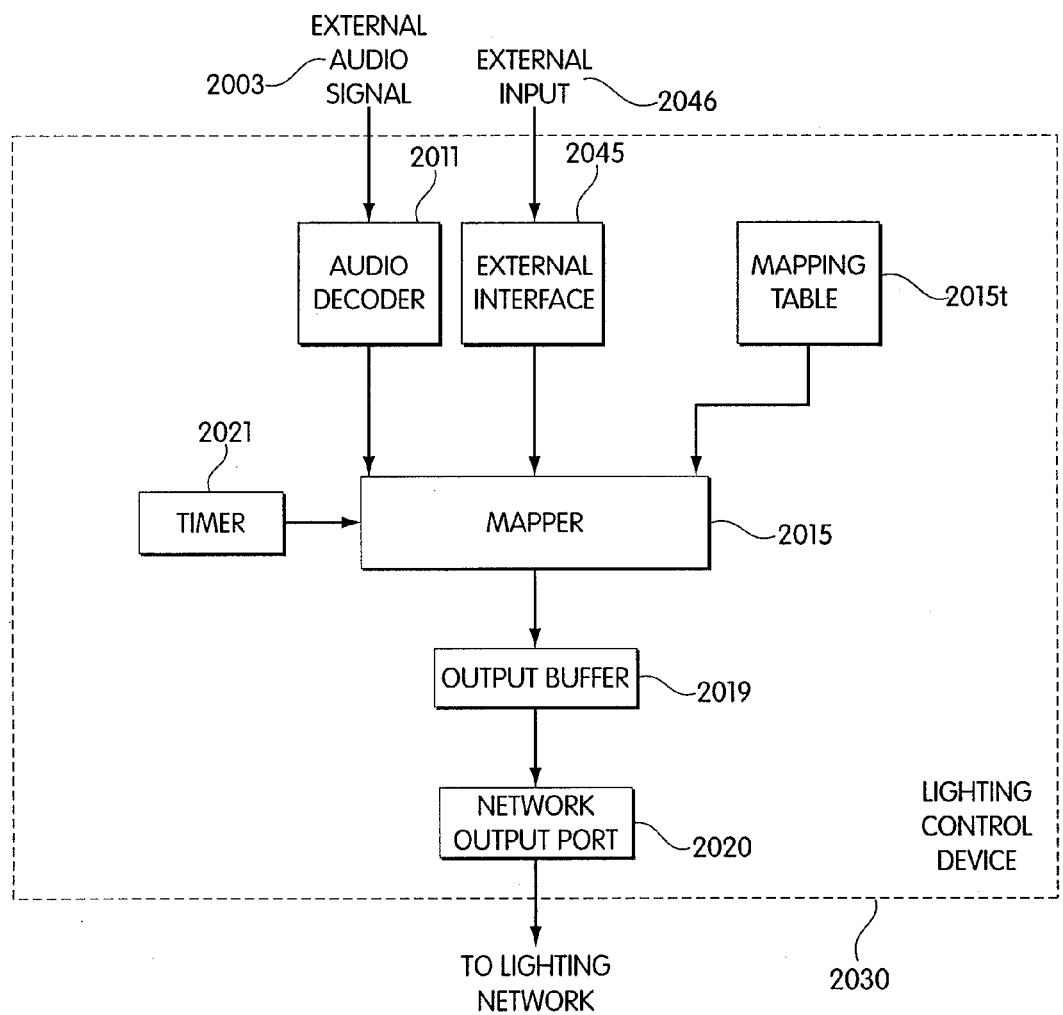
FIG. 10 is a diagram showing an example of a lighting control device in the apparatus of FIG. 9, according to one embodiment of the invention.

An even further simplified embodiment of the present invention is illustrated in FIG. 10, which illustrates a lighting control device 2030 that includes only a subset of the functionality provided in the embodiment of the invention shown in FIG. 8. Specifically, the embodiment of the invention shown in FIG. 10 does not include an audio player for generating an audio signal internally, and is not adapted to be coupled to a computer readable medium including audio data. Rather, the lighting control device 2030 is adapted to receive an external audio signal 2003 from any suitable source, and to then process the audio signal, in much the same manner as the embodiment of FIG. 8, to generate control signals for a lighting network to produce a lighting show based on the external audio input. Thus, the lighting control device 2030 includes an audio decoder 2011 and a mapper 2015 (with its associated table 2015*t*) that each performs the functions described above in terms of analyzing an external audio input signal and generating commands for a lighting network based thereon, and further includes a network output port 2020 compatible with the lighting network. The lighting control device 2030 may optionally include a timer 2021, output buffer 2019 and/or a cue table (not shown) that can perform the same functions described above in connection with the embodiment of FIG. 8.

In the embodiment shown in FIG. 10, the lighting control device 2030 includes an external interface 2045 for receiving an external input 2046, which can take any of numerous forms as discussed above in connection with the embodiment of FIG. 8. In accordance with one embodiment of the present invention, the external interface 2045 is adapted to be a simple interface that is relatively inexpensive and compact. The external interface can be used to perform any of numerous functions, such as to switch between lighting programs (e.g., entries in the mapping table 2015t), to vary lighting effects or parameters therefore, or any of the other functions discussed above in connection with the embodiments of FIGS. 1-9. The external interface can take any of numerous forms, including switches, buttons, dials, sliders, a console, a keyboard, a speech recognition system or any other device, such as a sensor (e.g., responsive to light, motion or temperature) whereby a command or signal can be provided to the lighting control device 2030. An external device may be coupled to the external interface 2045 via any suitable technique, including a direct wire connection, or via RF or some other type of wireless connection.

It should be appreciated that the lighting control device 2030 may receive the external audio signal using any suitable interface, such as the serial port, USB port, parallel port, IR receiver, a standard stereo audio jack, or any other suitable interface.

The components on the lighting control device 2030 can be powered in any of numerous ways, including through the provision of a power source (e.g., a battery) within the lighting control device 2030, or through the provision of an interface for receiving a power cord compatible with a standard electrical outlet. However, in accordance with one illustrative embodiment of the present invention, the lighting control device 2030 is provided with neither an onboard power source nor an interface for a standard electrical outlet. Thus, in accordance with one illustrative embodiment of the invention, the interface for connecting the lighting control device 2030 to a lighting network 2001 enables not only the transfer of data or other communication signals, but also sufficient electrical current to power the components within the lighting control device 2030. The need for a separate power interface may be thereby eliminated. The present invention is not limited to the use of any particular type of interface. One example of a suitable interface that provides both communication and power is a USB port.

The lighting control device 2030 may begin processing of the external audio signal 2003 and/or initiate the sending of control signals to the lighting network to initiate a lighting show either in response to a signal received at the external input 2046, or immediately upon receipt of the external audio signal 2003. Alternatively, the lighting control device 2030 may initiate a lighting show at a specified time, or upon any suitable condition. The lighting control device 2030 may continue to send control information to the lighting network until it no longer receives any external audio signal 2003, until a signal is received at the external input 2046, until the occurrence of a specified condition, until a particular point in time, or any other suitable event. In one embodiment of the present invention, the lighting control device 2030 includes a storage device to store the mapping table 2015t. The storage device can be a memory unit, database, or other suitable module (e.g., a removable Flash memory) for storing one or more lighting programs in the mapping table 2015t. In accordance with one embodiment of the present invention, the storage device is formed as a non-volatile memory device, such that once information is stored thereon, the information is maintained, even when no power is provided to the lighting control device 2030.

It should be appreciated that any single component or collection of multiple components of the above-described embodiments that perform the functions described above can be generically considered as one or more controllers that control the above-discussed functions. The one or more controllers can be implemented in numerous ways, such as with dedicated hardware, or using a processor that is programmed to perform the functions recited above. In this respect, it should be appreciated that one implementation of the present invention comprises at least one computer readable medium (e.g., a computer memory, a floppy disk, a compact disk, a tape, etc.) encoded with a computer program that, when executed on a processor, performs the above-discussed functions of the present invention. The computer readable medium can be transportable such that the program stored thereon can be loaded onto any device having a processor to implement the aspects of the present invention discussed above. In addition, it should be appreciated that the reference to a computer program that, when executed, performs the above-discussed functions is not limited to an application program, but rather is used herein in the generic sense to reference any type of computer code (e.g., software or microcode) that can be employed to program a processor to implement the above-discussed aspects of the present invention.

As used herein, the reference to an LED is intended to encompass any light emitting semiconductor device. In addition, any reference to a light or illumination unit generating a "color" refers to the generation of any frequency of radiation, including not only frequencies within the visible spectrum, but also frequencies in the infrared, ultraviolet and other areas of the electromagnetic spectrum.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and equivalents thereto.

What is claimed is:

1. A method for executing a lighting program to control a plurality of light emitting diodes (LEDs), the method comprising acts of
   (A) receiving an audio input in a digital music file format;
   (B) digitally processing the audio input to determine at least one characteristic of the audio input;
   (C) executing the lighting program to generate control signals to control the plurality of LEDs; and
   (D) during execution of the lighting program in the act (C), generating at least one of the control signals based at least in part on the at least one characteristic of the audio input;
   wherein the act (B) includes an act of determining a beat of the audio input, and wherein the at least one characteristic of the audio input relates to the beat;
   wherein the lighting program includes at least one variable parameter that affects a perceivable aspect of a lighting effect generated by the plurality of LEDs in response to the control signals, and wherein the act (D) includes an act of modifying the at least one variable parameter during the execution of the lighting program in the act (C) to generate at least one of the control signals based at least in part on the determined beat of the audio input; and wherein the at least one variable parameter relates to a perceived speed of the lighting effect, and wherein the act (D) includes an act of modifying the at least one variable parameter so as to affect the perceived speed of the lighting effect based on a speed of the determined beat of the audio input.

2. The method of claim 1, wherein the act (B) includes an act of performing a frequency transformation of the audio input to determine an activity level within at least one frequency band, and wherein the at least one characteristic of the audio input relates to the activity level within the at least one frequency band.

3. The method of claim 1, wherein the act (B) includes an act of determining a volume of the audio input, and wherein the at least one characteristic of the audio input relates to the volume.

4. The method of claim 1, wherein the act (B) includes an act of determining an intensity of the audio input, and wherein the at least one characteristic of the audio input relates to the intensity.

5. The method of claim 1, wherein the act (A) includes an act of receiving the audio input as part of an audio/video signal.

6. The method of claim 1, wherein the act (C) includes an act of transmitting pulse width modulated signals to the plurality of LEDs to control a perceived intensity of each of the plurality of LEDs.

7. The method of claim 1, wherein the act (C) includes an act of executing a lighting program having at least one variable that has an input value, and wherein the act (D) includes an act of providing the at least one characteristic of the audio input as the input value of the at least one variable.

8. The method of claim 1, wherein the lighting program is a first lighting program, and wherein the method further includes an act of, during execution of the first lighting program in the act (C), switching to execution of a second lighting program in response to the at least one characteristic of the audio input.

9. The method of claim 1, further including an act of, during execution of the lighting program in the act (C), assigning an effect to at least one of the plurality of LEDs based at least in part on the at least one characteristic of the audio input.

10. The method of claim 1, further including an act of, during execution of the lighting program in the act (C), determining a parameter of at least one effect assigned to at least one of the plurality of LEDs based at least in part on the at least one characteristic of the audio input.

11. The method of claim 1, wherein the method further includes an act of providing a cue table that identifies various actions to be taken during execution of the lighting program in response to at least two inputs received at the cue table, and wherein the act (D) includes acts of:
providing at least two characteristics of the audio input as inputs to the cue table; and
during execution of the lighting program, generating at least one of the control signals in response to an output of the cue table.

12. The method of claim 1, wherein the lighting program performs a mapping from the at least one characteristic of the audio input to the at least one of the control signals, wherein the method further includes an act of providing a cue table that identifies various actions to be taken during execution of the lighting program in response to at least two inputs received at the cue table, and wherein the act (D) includes acts of:
providing at least two characteristics of the audio input as inputs to the cue table; and
during execution of the lighting program, changing the mapping performed by the lighting program in response to an output of the cue table.

13. The method of claim 1, wherein the at least one characteristic of the audio input includes at least first and second characteristics, wherein the lighting program performs a mapping function from the first characteristic of the audio input to the at least one of the control signals, and wherein the act (D) includes an act of, during execution of the lighting program in the act (C), changing the mapping function performed by the lighting program in response to the second characteristic of the audio input.

14. The method of claim 13, wherein the lighting program is a first lighting program, and wherein the method further includes an act of, during execution of the first lighting program in the act (C), switching to execution of a second lighting program in response to the second characteristic of the audio input.

15. The method of claim 1, wherein the act (B) includes an act of digitally processing the audio input to determine a plurality of characteristics of the audio input; and wherein the act (D) includes an act of, during execution of the lighting program in the act (C), generating the control signals based at least in part on the plurality of characteristics of the audio input.

16. The method of claim 1, wherein the act (C) includes an act of executing the lighting program on a device coupled to at least one user interface; and
wherein the method further includes an act of, during execution of the lighting program in the act (C), generating at least one of the control signals based at least in part on user input provided via the at least one user interface.

17. The method of claim 1, wherein the act (C) includes an act of executing the lighting program on a device coupled to at least one user interface;
wherein the lighting program performs a mapping function from the at least one characteristic of the audio input to the at least one of the control signals; and
wherein the method further includes an act of changing the mapping function performed by the lighting program in response to an input received from the user interface.

18. A computer readable medium encoded with a computer program that, when executed, performs a method for executing a lighting program to control a plurality of light emitting diodes (LEDs), the method comprising acts of
(A) receiving an audio input in a digital music file format;
(B) digitally processing the audio input to determine at least one characteristic of the audio input;
(C) executing the lighting program to generate control signals to control the plurality of LEDs; and
(D) during execution of the lighting program in the act (C), generating at least one of the control signals based at least in part on the at least one characteristic of the audio input;
wherein the act (B) includes an act of determining a beat of the audio input, and wherein the at least one characteristic of the audio input relates to the beat;
wherein the lighting program includes at least one variable parameter that affects a perceivable aspect of a lighting effect generated by the plurality of LEDs in response to the control signals, and wherein the act (D) includes an act of modifying the at least one variable parameter during the execution of the lighting program in the act (C) to generate at least one of the control signals based at least in part on the determined beat of the audio input; and wherein the at least one variable parameter relates to a perceived speed of the lighting effect, and wherein the act (D) includes an act of modifying the at least one variable parameter so as to affect the perceived speed of the lighting effect based on a speed of the determined beat of the audio input.

19. The computer readable medium of claim 18, further comprising an act of converting the audio input from an analog input to the digital music file format.

20. The computer readable medium of claim 18, wherein the act (B) includes an act of performing a frequency transformation on the audio input to determine an activity level within at least one frequency band, and wherein the at least one characteristic of the audio input relates to the activity level within the at least one frequency band.

21. The computer readable medium of claim 18, wherein the act (B) includes an act of determining a volume of the audio input, and wherein the at least one characteristic of the audio input relates to the volume.

22. The computer readable medium of claim 18, wherein the act (B) includes an act of determining an intensity of the audio input, and wherein the at least one characteristic of the audio input relates to the intensity.

23. The computer readable medium of claim 18, wherein the act (C) includes an act of transmitting pulse width modulated signals to the plurality of LEDs to control a perceived intensity of each of the plurality of LEDs.

24. The computer readable medium of claim 18, wherein the act (C) includes an act of executing a lighting program having at least one variable that has an input value, and wherein the act (D) includes an act of providing the at least one characteristic of the audio input as the input value of the at least one variable.

25. The computer readable medium of claim 18, wherein the lighting program is a first lighting program, and wherein the method further includes an act of, during execution of the first lighting program in the act (C), switching to execution of a second lighting program in response to the at least one characteristic of the audio input.

26. The computer readable medium of claim 18, wherein the method further includes an act of, during execution of the lighting program in the act (C), assigning an effect to at least one of the plurality of LEDs based at least in part on the at least one characteristic of the audio input.

27. The computer readable medium of claim 18, further including an act of, during execution of the lighting program in the act (C), determining a parameter of at least one effect assigned to at least one of the plurality of LEDs based at least in part on the at least one characteristic of the audio input.

28. The computer readable medium of claim 18, wherein the act (B) includes an act of digitally processing the audio input to determine a plurality of characteristics of the audio input; and wherein the act (D) includes an act of, during execution of the lighting program in the act (C), generating the control signals based at least in part on the plurality of characteristics of the audio input.

29. The computer readable medium of claim 18, wherein the act (C) includes an act of executing the lighting program on a device coupled to at least one user interface; and wherein the method further includes an act of during execution of the lighting program in the act (C), generating at least one of the control signals based at least in part on user input provided via the at least one user interface.

30. The computer readable medium of claim 18, wherein the act (C) includes an act of executing the lighting program on a device coupled to at least one user interface;

wherein the lighting program performs a mapping function from the at least one characteristic of the audio input to the at least one of the control signals; and wherein the method further includes an act of changing the mapping function performed by the lighting program in response to an input received from the user interface.

31. An apparatus for executing a lighting program to control a plurality of light emitting diodes (LEDs), the apparatus comprising:

at least one storage medium to store the lighting program;

at least one input to receive an audio input in a digital music file format;

an audio decoder to digitally process the audio input to determine at least one characteristic of the audio input; and at least one controller, coupled to the audio decoder and the at least one storage medium, to execute the lighting program to generate control signals to control the plurality of LEDs, wherein the at least one controller generates at least one of the control signals based at least in part on the at least one characteristic of the audio input;

wherein the audio decoder determines a beat of the audio input, and wherein the at least one characteristic of the audio input relates to the beat;

wherein the lighting program includes at least one variable parameter that affects a perceivable aspect of a lighting effect generated by the plurality of LEDs in response to the control signals, and wherein the at least one controller modifies the at least one variable parameter during the execution of the lighting program to generate at least one of the control signals based at least in part on the determined beat of the audio input; and wherein the at least one variable parameter relates to a perceived speed of the lighting effect, and wherein the at least one controller modifies the at least one variable parameter so as to affect the perceived speed of the lighting effect based on a speed of the determined beat of the audio input.

32. The apparatus of claim 31, wherein the audio decoder performs a frequency transformation on the audio input to determine an activity level within at least one frequency band, and wherein the at least one characteristic of the audio input relates to the activity level within the at least one frequency band.

33. The apparatus of claim 31, wherein the audio decoder determines a volume of the audio input, and wherein the at least one characteristic of the audio input relates to the volume.

34. The apparatus of claim 31, wherein the audio decoder determines an intensity of the audio input, and wherein the at least one characteristic of the audio input relates to the intensity.

35. The apparatus of claim 31, wherein the at least one controller transmits pulse width modulated signals to the plurality of LEDs to control a perceived intensity of each of the plurality of LEDs.

36. The apparatus of claim 31, wherein the lighting program has at least one variable that has an input value, and wherein the at least one controller provides the at least one characteristic of the audio input as the input value of the at least one variable.

37. The apparatus of claim 31, wherein the lighting program is a first lighting program, wherein the at least one storage medium further stores a second lighting program, and wherein the at least one controller, during execution of the first lighting program, switches to execution of the second lighting program in response to the at least one characteristic of the audio input.

38. The apparatus of claim 31, wherein the at least one controller, during execution of the lighting program, assigns an effect to at least one of the plurality of LEDs based at least in part on the at least one characteristic of the audio input.

39. The apparatus of claim 31, wherein the at least one controller, during execution of the lighting program, determines a parameter of at least one effect assigned to at least one of the plurality of LEDs based at least in part on the at least one characteristic of the audio input.

40. The apparatus of claim 31, further including a cue table that identifies various actions to be taken during execution of the lighting program in response to at least two inputs received at the cue table, wherein the cue table is coupled to the audio decoder to receive information identifying at least two characteristics of the audio input, and wherein the at least one controller generates at least one of the control signals in response to an output of the cue table.

41. The apparatus of claim 31, wherein the at least one characteristic of the audio input includes at least first and second characteristics, wherein the lighting program performs a mapping function from the first characteristic of the audio input to the at least one of the control signals, and wherein the at least one controller, during execution of the lighting program, changes the mapping function performed by the lighting program in response to the second characteristic of the audio input.

42. The apparatus of claim 41, wherein the lighting program is a first lighting program, wherein the at least one storage medium further stores a second lighting program, and wherein the at least one controller, during execution of the first lighting program, switches to execution of the second lighting program in response to the second characteristic of the audio input.

43. The apparatus of claim 31, further including at least one user interface, and wherein the at least one controller, during execution of the lighting program, generates at least one of the control signals based at least in part on user input provided via the at least one user interface.

44. The apparatus of claim 31, further including at least one user interface; and
   wherein the lighting program performs a mapping function from the at least one characteristic of the audio input to the at least one of the control signals; and
   wherein the at least one controller changes the mapping function performed by the lighting program in response to an input received from the user interface.

45. A computer readable medium encoded with a first computer program that, when executed on a processor, performs a method for executing a lighting program to control a plurality of light emitting diodes (LEDs), wherein the computer readable medium is encoded with a second computer program that when executed on the processor, processes an audio input to determine at least one characteristic of the audio input, wherein the at least one characteristic includes a beat of the audio input, the method comprising acts of:

(A) receiving information from the second program relating to the at least one characteristic of the audio input, wherein the audio input is in a digital music file format;
   (B) executing the lighting program to generate control signals to control the plurality of LEDs; and
   (C) during execution of the lighting program in the act (B), generating at least one of the control signals based at least in part on the at least one characteristic of the audio input received from the second program, wherein the at least one characteristic of the audio input relates to the beat;
   wherein the lighting program includes at least one variable parameter that affects a perceivable aspect of a lighting effect generated by the plurality of LEDs in response to the control signals, and wherein the act (C) includes an act of modifying the at least one variable parameter during the execution of the lighting program in the act (B) to generate at least one of the control signals based at least in part on the determined beat of the audio input; and
   wherein the at least one variable parameter relates to a perceived speed of the lighting effect, and wherein the act (C) includes an act of modifying the at least one variable parameter so as to affect the perceived speed of the lighting effect based on a speed of the determined beat of the audio input.

46. The computer readable medium of claim 45, wherein the act (B) includes an act of transmitting pulse width modulated signals to the plurality of LEDs to control a perceived intensity of each of the plurality of LEDs.

47. The computer readable medium of claim 45, wherein the act (B) includes an act of executing a lighting program having at least one variable that has an input value, and
   wherein the act (C) includes an act of providing the at least one characteristic of the audio input as the input value of the at least one variable.

48. The computer readable medium of claim 45, wherein the at least one characteristic of the audio input includes at least first and second characteristics,
   wherein the lighting program performs a mapping function from the first characteristic of the audio input to the at least one of the control signals, and wherein the act (C) includes an act of, during execution of the lighting program in the act (B), changing the mapping function performed by the lighting program in response to the second characteristic of the audio input.

49. The computer readable medium of claim 45, wherein the act (B) includes an act of executing the lighting program on a device coupled to at least one user interface;
   wherein the lighting program performs a mapping function from the at least one characteristic of the audio input to the at least one of the control signals; and
   wherein the method further includes an act of changing the mapping function performed by the lighting program in response to an input received from the user interface.

50. The computer readable medium of claim 45, wherein the second program processes the audio input to determine at least one characteristic of the audio input, and wherein the first program is a plug-in compatible with an application programming interface provided by the second program.

51. A method for executing a lighting program to control a plurality of light emitting diodes (LEDs), the method comprising acts of:
   (A) receiving an audio input and an input from at least one timer, wherein the audio input is in a digital music file format;

(B) analyzing the audio input to determine at least one characteristic of the audio input;

(C) executing the lighting program to generate control signals to control the plurality of LEDs; and (D) during execution of the lighting program in the act (C), generating at least one of the control signals based at least in part on the at least one characteristic of the audio input and the input from the at least one timer;

wherein the act (B) includes an act of determining a beat of the audio input, and wherein the at least one characteristic of the audio input relates to the beat;

wherein the lighting program includes at least one variable parameter that affects a perceivable aspect of a lighting effect generated by the plurality of LEDs in response to the control signals, and wherein the act (D) includes an act of modifying the at least one variable parameter during the execution of the lighting program in the act (C) to generate at least one of the control signals based at least in part on the determined beat of the audio input; and wherein the at least one variable parameter relates to a perceived speed of the lighting effect, and wherein the act (D) includes an act of modifying the at least one variable parameter so as to affect the perceived speed of the lighting effect based on a speed of the determined beat of the audio input.

52. The method of claim 51, wherein the at least one characteristic of the audio input includes at least first and second characteristics, wherein the lighting program performs a mapping function from the first characteristic of the audio input to the at least one of the control signals, and wherein the act (D) includes an act of, during execution of the lighting program in the act (C), changing the mapping function performed by the lighting program in response to the second characteristic of the audio input.

53. The method of claim 51, wherein the act (C) includes an act of executing the lighting program on a device coupled to at least one user interface; and wherein the method further includes an act of, during execution of the lighting program in the act (C), generating at least one of the control signals based at least in part on user input provided via the at least one user interface.

54. The method of claim 51, wherein the act (C) includes an act of executing the lighting program on a device coupled to at least one user interface;

wherein the lighting program performs a mapping function from the at least one characteristic of the audio input to the at least one of the control signals; and wherein the method further includes an act of changing the mapping function performed by the lighting program in response to an input received from the user interface.

55. The method of claim 51, wherein the act (C) includes an act of transmitting pulse width modulated signals to the plurality of LEDs to control a perceived intensity of each of the plurality of LEDs.

56. The method of claim 51, wherein the act (C) includes an act of executing a lighting program having at least first and second variables that each has an input value, and wherein the act (D) includes an act of providing the at least one characteristic of the audio input as the input value of the first variable and the input from the at least one timer as the input value of the second variable.

57. The method of claim 51, wherein the lighting program is a first lighting program, and wherein the method further includes an act of, during execution of the first lighting program in the act (C), switching to execution of a second lighting program in response to the input from the at least one timer.

58. A computer readable medium encoded with a computer program that, when executed, performs a method for executing a lighting program to control a plurality of light emitting diodes (LEDs), the method comprising acts of:

(A) receiving an audio input and an input from at least one timer, wherein the audio input is in a digital music file format;

(B) analyzing the audio input to determine at least one characteristic of the audio input;

(C) executing the lighting program to generate control signals to control the plurality of LEDs; and (D) during execution of the lighting program in the act (C), generating at least one of the control signals based at least in part on the at least one characteristic of the audio input and the input from the at least one timer;

wherein the act (B) includes an act of determining a beat of the audio input, and wherein the at least one characteristic of the audio input relates to the beat;

wherein the lighting program includes at least one variable parameter that affects a perceivable aspect of a lighting effect generated by the plurality of LEDs in response to the control signals, and wherein the act (D) includes an act of modifying the at least one variable parameter during the execution of the lighting program in the act (C) to generate at least one of the control signals based at least in part on the determined beat of the audio input; and wherein the at least one variable parameter relates to a perceived speed of the lighting effect, and wherein the act (D) includes an act of modifying the at least one variable parameter so as to affect the perceived speed of the lighting effect based on a speed of the determined beat of the audio input.

59. The computer readable medium of claim 58, wherein the at least one characteristic of the audio input includes at least first and second characteristics, wherein the lighting program performs a mapping function from the first characteristic of the audio input to the at least one of the control signals, and wherein the act (D) includes an act of, during execution of the lighting program in the act (C), changing the mapping function performed by the lighting program in response to the second characteristic of the audio input.

60. The computer readable medium of claim 58, wherein the act (C) includes an act of executing the lighting program on a device coupled to at least one user interface; and wherein the method further includes an act of, during execution of the lighting program in the act (C), generating at least one of the control signals based at least in part on user input provided via the at least one user interface.

61. The computer readable medium of claim 58, wherein the act (C) includes an act of executing the lighting program on a device coupled to at least one user interface;

wherein the lighting program performs a mapping function from the at least one characteristic of the audio input to the at least one of the control signals; and wherein the method further includes an act of changing the mapping function performed by the lighting program in response to an input received from the user interface.

62. The computer readable medium of claim 58, wherein the act (C) includes an act 30 of transmitting pulse width modulated signals to the plurality of LEDs to control a perceived intensity of each of the plurality of LEDs.

63. The computer readable medium of claim 58, wherein the act (C) includes an act of executing a lighting program having at least first and second variables that each has an input value, and wherein the act (D) includes an act of providing the at least one characteristic of the audio input as the input value of the first variable and the input from the at least one timer as the input value of the second variable.

64. The computer readable medium of claim 58, wherein the lighting program is a first lighting program, and wherein the method further includes an act of, during execution of the first lighting program in the act (C), switching to execution of a second lighting program in response to the input from the at least one timer.

65. A computer readable medium encoded with a first computer program that, when executed on a processor, performs a method for executing a lighting program to control a plurality of light emitting diodes (LEDs), wherein the computer readable medium is encoded with a second computer program that when executed on the processor, processes an audio input to determine at least one characteristic of the audio input, wherein the at least one characteristic includes a beat of the audio input, the method comprising acts of
(A) receiving information from the second program relating to the at least one characteristic of the audio input and an input from at least one timer, wherein the audio input is in a digital music file format;
(B) executing the lighting program to generate control signals to control the plurality of LEDs; and
(C) during execution of the lighting program in the act (B), generating at least one of the control signals based at least in part on the at least one characteristic of the audio input and the input from the at least one timer, wherein the at least one characteristic of the audio input relates to the beat;
wherein the lighting program includes at least one variable parameter that affects a perceivable aspect of a lighting effect generated by the plurality of LEDs in response to the control signals, and wherein the act (C) includes an act of modifying the at least one variable parameter during the execution of the lighting program in the act (B) to generate at least one of the control signals based at least in part on the determined beat of the audio input; and
wherein the at least one variable parameter relates to a perceived speed of the lighting effect, and wherein the act (C) includes an act of modifying the at least one variable parameter so as to affect the perceived speed of the lighting effect based on a speed of the determined beat of the audio input.

66. The computer readable medium of claim 65, wherein the at least one characteristic of the audio input includes at least first and second characteristics, wherein the lighting program performs a mapping function from the first characteristic of the audio input to the at least one of the control signals, and wherein the act (C) includes an act of, during execution of the lighting program in the act (B), changing the mapping function performed by the lighting program in response to the second characteristic of the audio input.

67. The computer readable medium of claim 65, wherein the act (B) includes an act of executing the lighting program on a device coupled to at least one user interface; and
wherein the method further includes an act of, during execution of the lighting program in the act (B), generating at least one of the control signals based at least in part on user input provided via the at least one user interface.

68. The computer readable medium of claim 65, wherein the act (B) includes an act of executing the lighting program on a device coupled to at least one user interface;
wherein the lighting program performs a mapping function from the at least one characteristic of the audio input to the at least one of the control signals; and
wherein the method further includes an act of changing the mapping function performed by the lighting program in response to an input received from the user interface.

69. The computer readable medium of claim 65, wherein the act (B) includes an act of transmitting pulse width modulated signals to the plurality of LEDs to control a perceived intensity of each of the plurality of LEDs.

70. The computer readable medium of claim 65, wherein the act (B) includes an act of executing a lighting program having at least first and second variables that each has an input value, and wherein the act (C) includes an act of providing the at least one characteristic of the audio input as the input value of the first variable and the input from the at least one timer as the input value of the second variable.

71. The computer readable medium of claim 65, wherein the lighting program is a first lighting program, and wherein the method further includes an act of, during execution of the first lighting program in the act (B), switching to execution of a second lighting program in response to the input from the at least one timer.

72. An apparatus for executing a lighting program to control a plurality of light emitting diodes (LEDs), the apparatus comprising:
at least one storage medium to store the lighting program;
at least one input to receive an audio input, wherein the audio input is in a digital music file format;
an audio decoder to process the audio input to determine at least one characteristic of the audio input; and
at least one controller, coupled to the audio decoder and the at least one storage medium, to execute the lighting program to generate control signals to control the plurality of LEDs;
wherein the at least one controller generates at least one of the control signals based at least in part on the at least one characteristic of the audio input and an input from at least one timer;
wherein the audio decoder determines a beat of the audio input, and wherein the at least one characteristic of the audio input relates to the beat;
wherein the lighting program includes at least one variable parameter that affects a perceivable aspect of a lighting effect generated by the plurality of LEDs in response to the control signals, and wherein the at least one controller modifies the at least one variable parameter during the execution of the lighting program to generate at least one of the control signals based at least in part on the determined beat of the audio input; and
wherein the at least one variable parameter relates to a perceived speed of the lighting effect, and wherein the at least one controller modifies the at least one variable parameter so as to affect the perceived speed of the lighting effect based on a speed of the determined beat of the audio input.

73. The apparatus of claim 72, further including the at least one timer.

74. The apparatus of claim 72, wherein the at least one characteristic of the audio input includes at least first and second characteristics, wherein the lighting program performs a mapping function from the first characteristic of the audio input to the at least one of the control signals, and wherein the at least one controller, during execution of the lighting program, changes the mapping function performed by the lighting program in response to the second characteristic of the audio input.

75. The apparatus of claim 72, further including at least one user interface, and
wherein the at least one controller generates at least one of the control signals based at least in part on user input provided via the at least one user interface.

76. The apparatus of claim 72, further including at least one user interface; and
wherein the lighting program performs a mapping function from the at least one characteristic of the audio input to the at least one of the control signals; and
wherein the at least one controller changes the mapping function performed by the lighting program in response to an input received from the user interface.

77. The apparatus of claim 72, wherein the at least one controller transmits pulse width modulated signals to the plurality of LEDs to control a perceived intensity of each of the plurality of LEDs.

78. The apparatus of claim 72, wherein the lighting program having at least first and second variables that each has an input value, and wherein the at least one controller provides the at least one characteristic of the audio input as the input value of the first variable and the input from the at least one timer as the input value of the second variable.

79. The apparatus of claim 72, wherein the lighting program is a first lighting program, and wherein the at least one controller, during execution of the first lighting program, switches to execution of a second lighting program in response to the input from the at least one timer.

80. A method for executing a lighting program to control a plurality of light emitting diodes (LEDs), the method comprising acts of:
(A) receiving an audio input and an input from a graphical user interface, wherein the audio input is in a digital music file format;
(B) analyzing the audio input to determine at least one characteristic of the audio input;
(C) executing the lighting program to generate control signals to control the plurality of LEDs; and
(D) during execution of the lighting program in the act (C), generating at least one of the control signals based at least in part on the at least one characteristic of the audio input and the input from the graphical user interface;
wherein the act (B) includes an act of determining a beat of the audio input, and wherein the at least one characteristic of the audio input relates to the beat;
wherein the lighting program includes at least one variable parameter that affects a perceivable aspect of a lighting effect generated by the plurality of LEDs in response to the control signals, and wherein the act (D) includes an act of modifying the at least one variable parameter during the execution of the lighting program in the act (C) to generate at least one of the control signals based at least in part on the determined beat of the audio input; and
wherein the at least one variable parameter relates to a perceived speed of the lighting effect, and wherein the act (D) includes an act of modifying the at least one variable parameter so as to affect the perceived speed of the lighting effect based on a speed of the determined beat of the audio input.

81. A method for execution on a computer, the method comprising acts of:
(A) processing, on the computer, information indicative of an audio input signal to generate a speaker-compatible signal indicative of the audio input signal, wherein the audio input signal is in a digital music file format;
(B) determining at least one characteristic of the audio input signal;
(C) executing, on the computer, a lighting program to generate control signals to control a plurality of light emitting diodes (LEDs);
(D) during execution of the lighting program in the act (C), generating at least one of the control signals based at least in part on the at least one characteristic of the audio input signal; and
(E) transmitting the speaker-compatible signal to a speaker to generate audible sound indicative of the audio input signal;
wherein the act (B) includes an act of determining a beat of the audio input, and wherein the at least one characteristic of the audio input relates to the beat;
wherein the lighting program includes at least one variable parameter that affects a perceivable aspect of a lighting effect generated by the plurality of LEDs in response to the control signals, and wherein the act (D) includes an act of modifying the at least one variable parameter during the execution of the lighting program in the act (C) to generate at least one of the control signals based at least in part on the determined beat of the audio input; and
wherein the at least one variable parameter relates to a perceived speed of the lighting effect, and wherein the act (D) includes an act of modifying the at least one variable parameter so as to affect the perceived speed of the lighting effect based on a speed of the determined beat of the audio input.

82. The method of claim 81, wherein the act (A) includes an act of processing information, received from another device, indicative of an audio input signal to generate the speaker-compatible signal.

83. The method of claim 81, wherein the act (A) includes an act of reading digital information, stored on a computer readable medium coupled to the computer, indicative of the audio input signal to generate the speaker-compatible signal.

84. A method for authoring a lighting program to control a plurality of light emitting diodes (LEDs) is response to at least one characteristic of an audio input, the method comprising acts of:
(A) providing a graphical user interface (GUI) that displays a plurality of icons representative of the plurality of LEDs, wherein the plurality of icons are configured to be selected and arranged on a layout space of the GUI in response to user inputs provided via the GUI, information representative of a plurality of lighting effects to be assigned thereto, and information representative of the at least one characteristic of the audio input, wherein the audio input is in a digital music file format;
(B) selecting, based on at least one user input provided via the GUI, at least one of the plurality of lighting effects to correspond to at least one of the plurality of LEDs in response to the at least one characteristic of the audio input; and
(C) creating a lighting program, based on the at least one user input, for generating control information for the plurality of LEDs.

85. A method for executing a lighting program to control a plurality of light emitting diodes (LEDs), the method comprising acts of:
- (A) receiving an audio input, wherein the audio input is in a digital music file format;
- (B) analyzing the audio input to determine at least one characteristic of the audio input;
- (C) storing information related to the at least one characteristic of the audio input;
- (D) executing the lighting program, after completion of the act (C), to generate control signals to control the plurality of LEDs; and
- (E) during execution of the lighting program in the act (D), reading the stored information and generating at least one of the control signals based at least in part on the at least one characteristic of the audio input;

wherein the act (B) includes an act of determining a beat of the audio input, and wherein the at least one characteristic of the audio input relates to the beat;

wherein the lighting program includes at least one variable parameter that affects a perceivable aspect of a lighting effect generated by the plurality of LEDs in response to the control signals, and wherein the act (E) includes an act of modifying the at least one variable parameter during the execution of the lighting program in the act (D) to generate at least one of the control signals based at least in part on the determined beat of the audio input; and wherein the at least one variable parameter relates to a perceived speed of the lighting effect, and wherein the act (E) includes an act of modifying the at least one variable parameter so as to affect the perceived speed of the lighting effect based on a speed of the determined beat of the audio input.

86. A method for executing a lighting program to control a plurality of light emitting diodes (LEDs) to create a light show, the method comprising acts of:
- (A) receiving an audio input having a duration and varying in time during the duration of the audio input, wherein the audio input is in a digital music file format;
- (B) digitally processing the audio input to determine at least one first characteristic of the audio input at a first time during the duration;
- (C) executing the lighting program in synchronization with the audio input to generate control signals to control the plurality of LEDs, wherein the lighting program is arranged to control the plurality of LEDs to display, as part of the light show, a lighting sequence comprising at least two lighting effects spaced in time; and
- (D) during execution of the lighting program in the act (C) at a time that is prior to the first time during the duration of the audio input, generating at least one of the control signals based at least in part on the at least one first characteristic of the audio input so that the light show anticipates changes in the audio input.

87. The computer readable medium of claim 18, wherein the at least one characteristic of the audio input includes at least first and second characteristics, wherein the lighting program performs a mapping function from the first characteristic of the audio input to the at least one of the control signals, and wherein the act (D) includes an act of, during execution of the lighting program in the act (C), changing the mapping function performed by the lighting program in response to the second characteristic of the audio input.

88. The computer readable medium of claim 87, wherein the lighting program is a first lighting program, and wherein the method further includes an act of, during execution of the first lighting program in the act (C), switching to execution of a second lighting program in response to the second characteristic of the audio input.

89. The method of claim 1, wherein the lighting program is arranged to control the plurality of LEDs to display a lighting sequence comprising at least two lighting effects spaced in time.

90. The computer readable medium of claim 18, wherein the lighting program is arranged to control the plurality of LEDs to display a lighting sequence comprising at least two lighting effects spaced in time.

91. The apparatus of claim 31, wherein the lighting program is arranged to control the plurality of LEDs to display a lighting sequence comprising at least two lighting effects spaced in time.

92. The method of claim 1, wherein the digital music file format is an MP3 format, a MIDI format, a MOD format, a CDA format, a CDA format, a WMA format, an AS format, or a WAV format.

93. The computer readable medium of claim 18, wherein the digital music file format is an MP3 format, a MIDI format, a MOD format, a CDA format, a CDA format, a WMA format, an AS format, or a WAV format.

94. The apparatus of claim 31, wherein the digital music file format is an MP3 format, a MIDI format, a MOD format, a CDA format, a CDA format, a WMA format, an AS format, or a WAV format.

* * * * *